US012756894B2

(12) United States Patent
Danek et al.

(10) Patent No.: US 12,756,894 B2
(45) Date of Patent: Oct. 6, 2026

(54) METHODS AND SYSTEMS FOR REMOTE RENDERING

(71) Applicant: signageOS s.r.o., Prague (CZ)

(72) Inventors: Lukas Danek, Prague (CZ); Michael Zabka, Prague (CZ); Stanislav Richter, Prague (CZ)

(73) Assignee: signageOS s.r.o., Prague (CZ)

( * ) Notice: Subject to any disclaimer, the term of this patent is extended or adjusted under 35 U.S.C. 154(b) by 0 days.

(21) Appl. No.: 19/226,060

(22) Filed: Jun. 2, 2025

(65) Prior Publication Data

US 2026/0230673 A1 Aug. 6, 2026

Related U.S. Application Data

(60) Provisional application No. 63/752,805, filed on Feb. 2, 2025.

(51) Int. Cl.

| | |
|---|---|
| ***H04N 21/4402*** | (2011.01) |
| ***H04N 21/231*** | (2011.01) |
| ***H04N 21/44*** | (2011.01) |
| ***H04N 21/442*** | (2011.01) |

(52) U.S. Cl.
CPC ............... *H04N 21/440263* (2013.01); *H04N 21/23106* (2013.01); *H04N 21/44004* (2013.01); *H04N 21/44209* (2013.01)

(58) Field of Classification Search
CPC ..... H04N 21/440263; H04N 21/23106; H04N 21/44004; H04N 21/44209
See application file for complete search history.

(56) References Cited

U.S. PATENT DOCUMENTS

| | | | |
|---|---|---|---|
| 8,433,814 | B2 | 4/2013 | Park |
| 10,687,106 | B2 | 6/2020 | Afshar |
| 10,880,347 | B1 | 12/2020 | Krishnan |
| 10,972,511 | B2 | 4/2021 | Tsaplin |
| 11,589,133 | B2 | 2/2023 | Garten |
| 11,831,942 | B2 | 11/2023 | Van Baren |
| 2003/0200553 | A1 | 10/2003 | Cole |
| 2010/0118200 | A1 | 5/2010 | Gelman |

FOREIGN PATENT DOCUMENTS

| | | |
|---|---|---|
| CN | 103985332 | 8/2014 |
| CN | 116261003 | 6/2023 |
| CN | 118264651 | 6/2024 |
| KR | 20170027290 | 3/2017 |
| KR | 101842108 | 3/2018 |

*Primary Examiner* — Rong Le
(74) *Attorney, Agent, or Firm* — Soody Tronson; STLG Law Firm

(57) ABSTRACT

A computer-implemented method and system for remote rendering and delivery of content across a multi-tiered architecture.

20 Claims, 16 Drawing Sheets

METHODS AND SYSTEMS FOR REMOTE RENDERING

BACKGROUND

Digital signage and hospitality televisions have become an integral part of modern advertising and information dissemination, offering dynamic content delivery across various platforms and environments. There is a growing demand for integrated solutions that reduce hardware dependency while maintaining high-quality content delivery.

Figure 3:
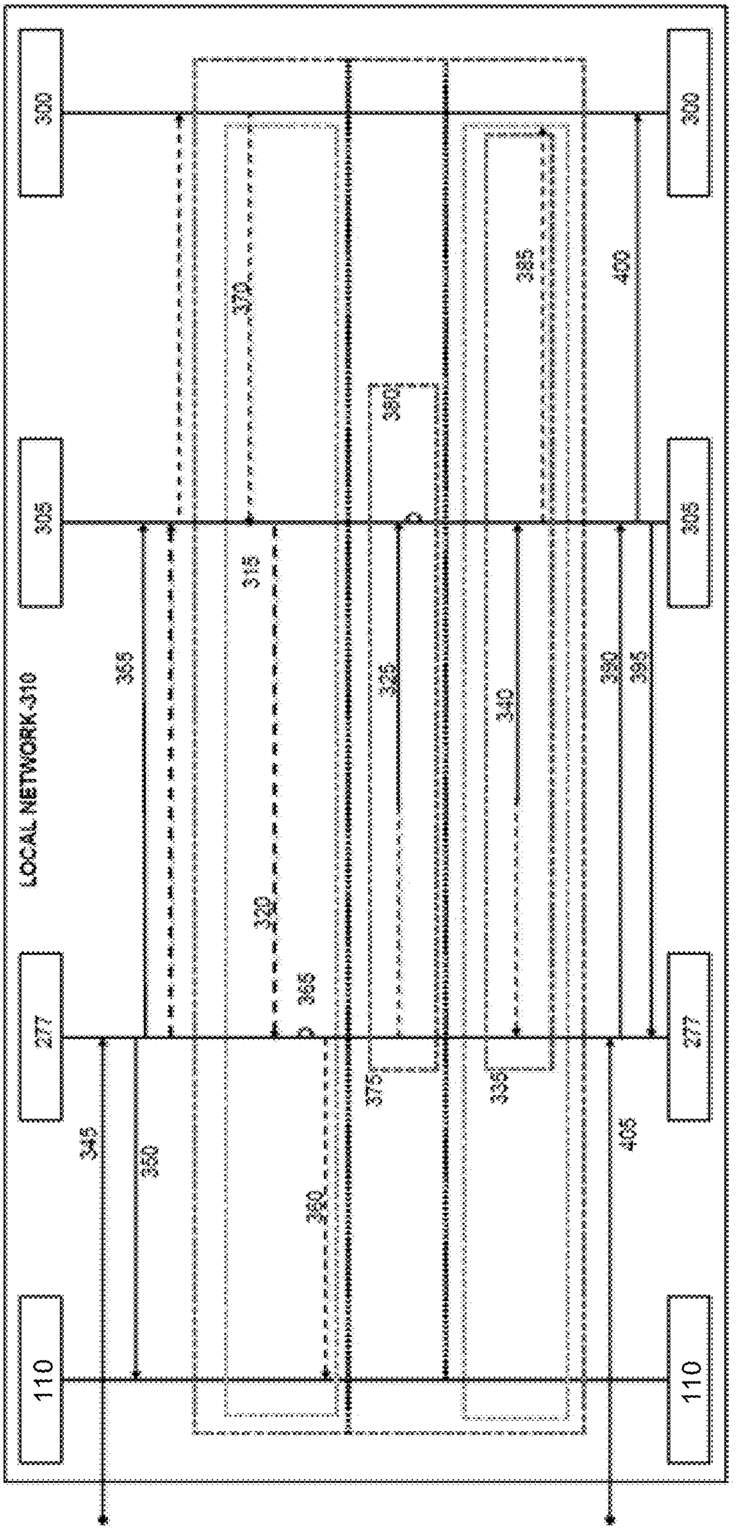
FIG. 3 is a block diagram showing an example system for rendering content to devices with limited capabilities.
Figure 4:
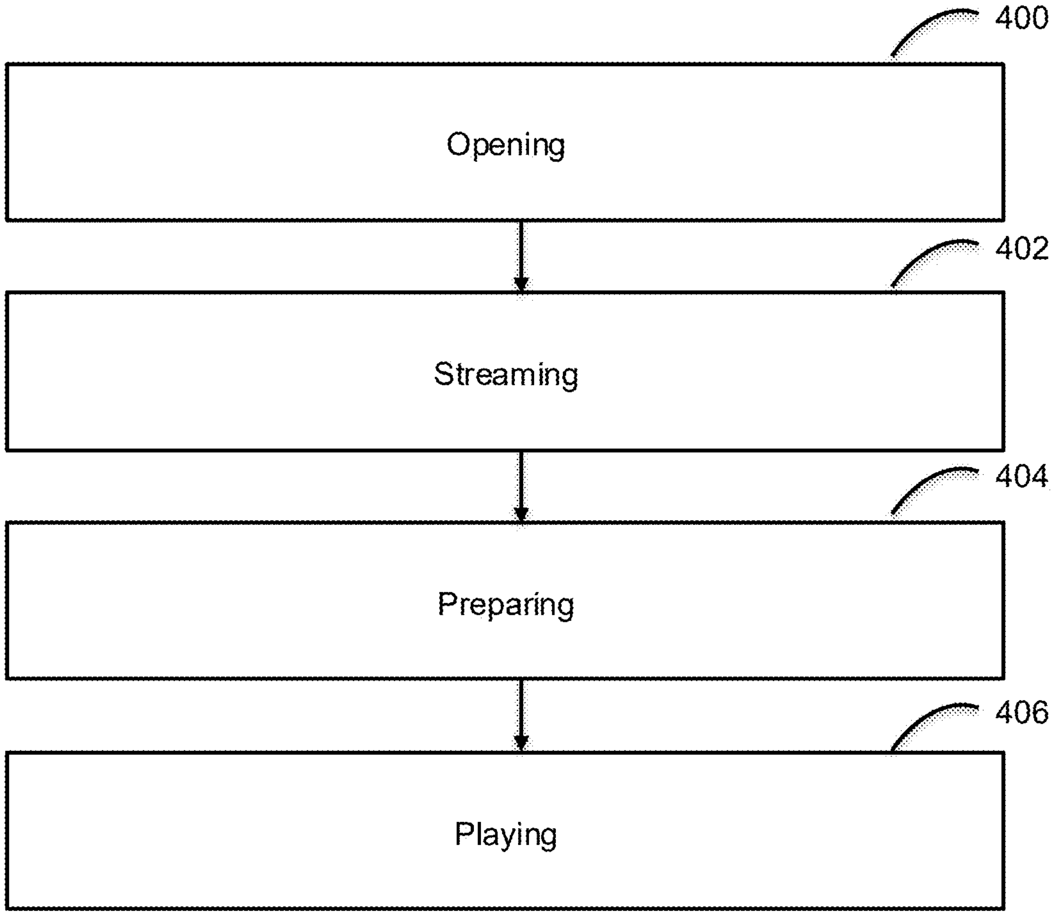
FIG. 4 illustrates an example method for rendering high-resolution content to client displays with limited capabilities using server-based software.
Figure 5A:
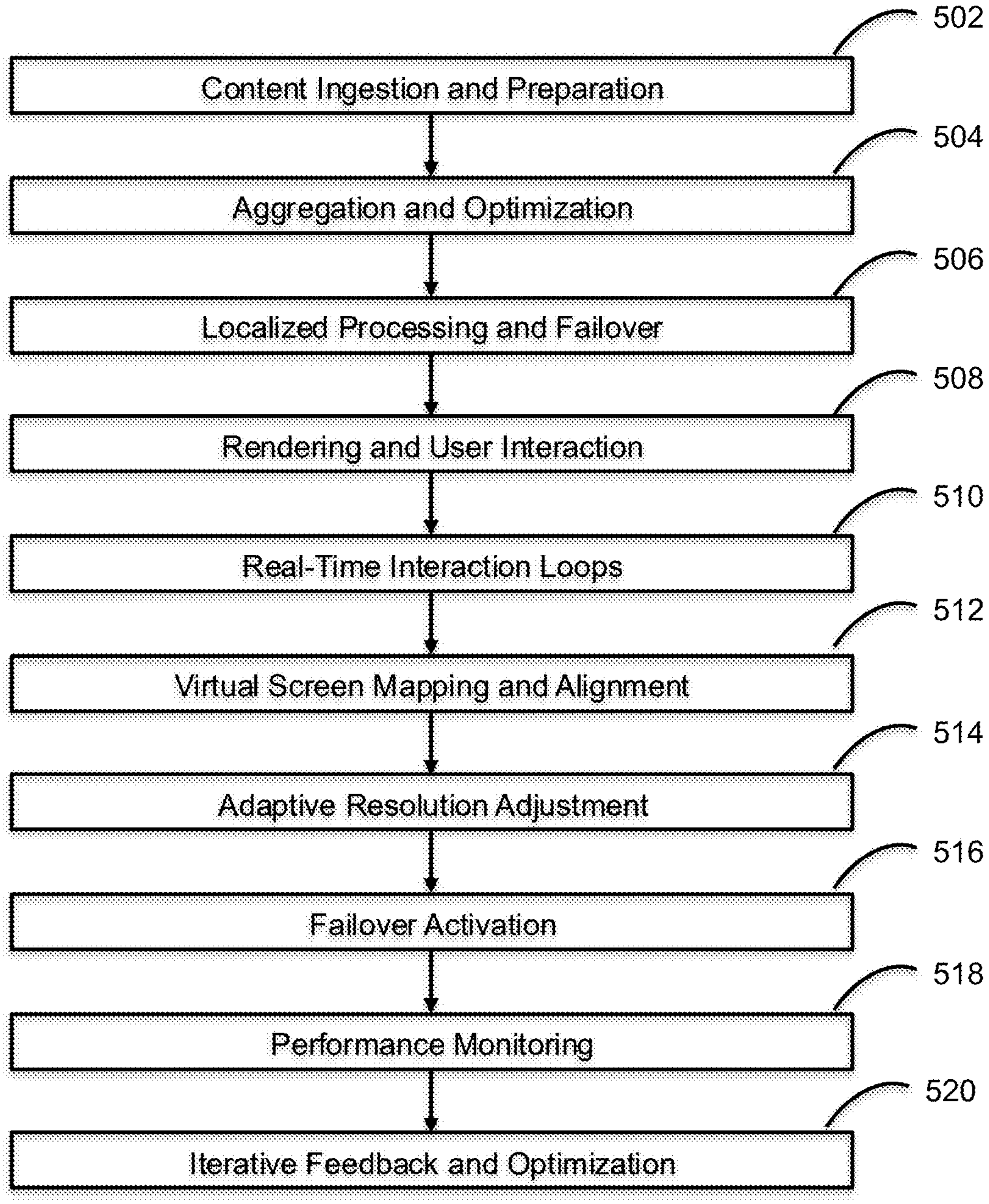
FIG. 5A shows a block diagram of an example multi-layer content delivery system that integrates cloud, edge, and client device layers to ingest, optimize, distribute, render, and monitor content seamlessly across diverse network conditions.
Figure 5B:
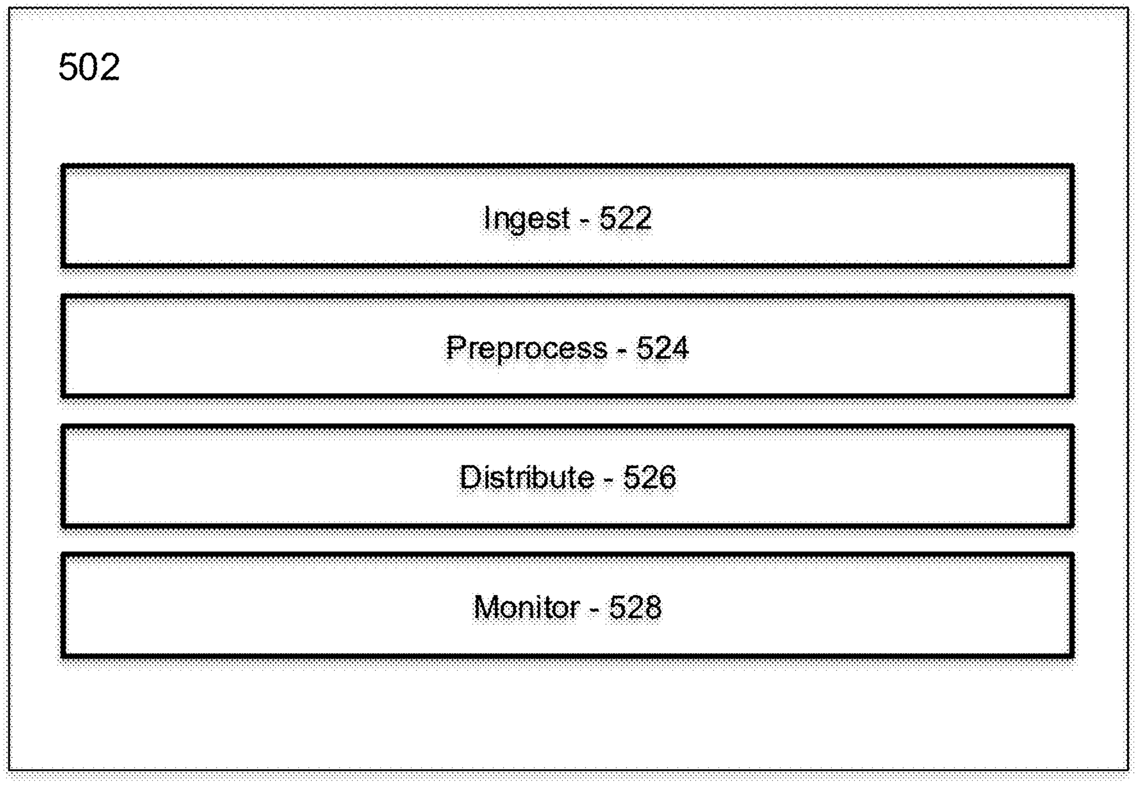
FIG. 5B shows a block diagram of an example content ingestion and preparation system at the cloud layer of FIG. 5, where multimedia assets are ingested, preprocessed, and standardized for distribution.
Figure 5C:
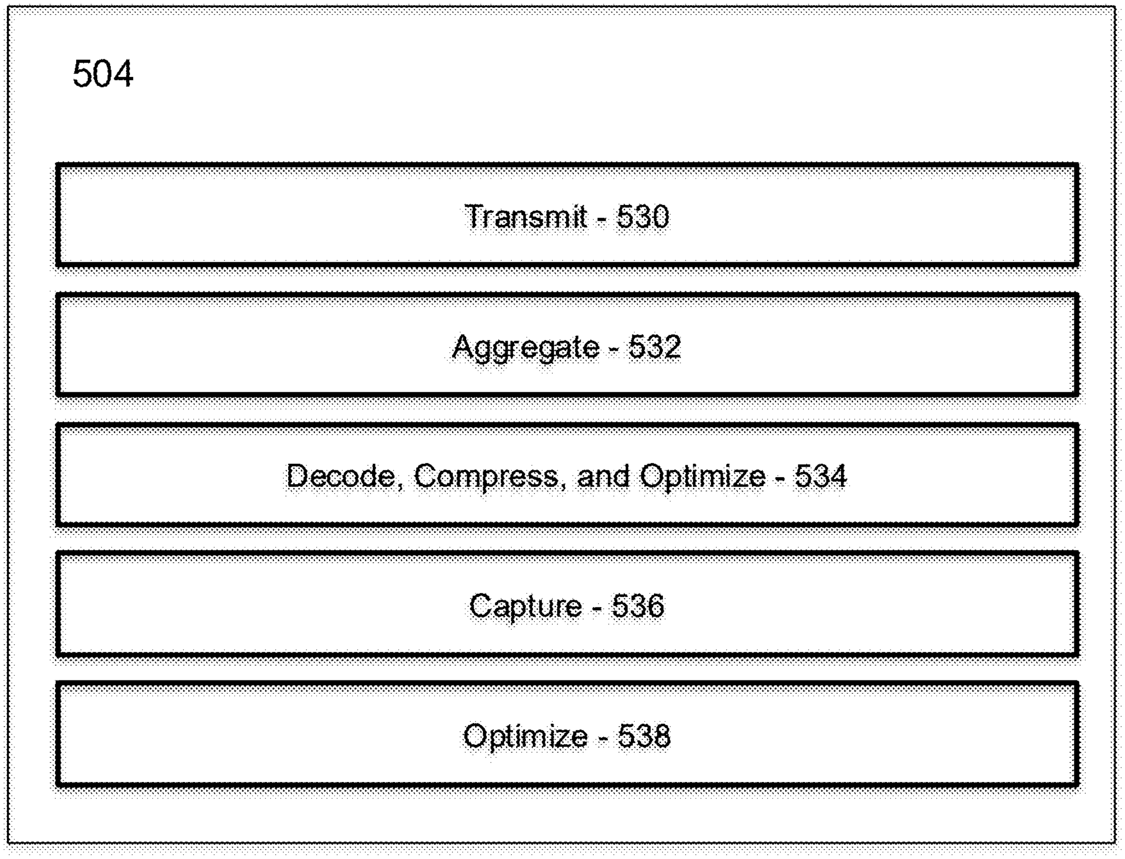
FIG. 5C shows a block diagram of an example aggregation and optimization system at the streaming layer of FIG. 5, where multimedia streams are aggregated, decoded, compressed, and optimized for efficient multi-device delivery.
Figure 5D:
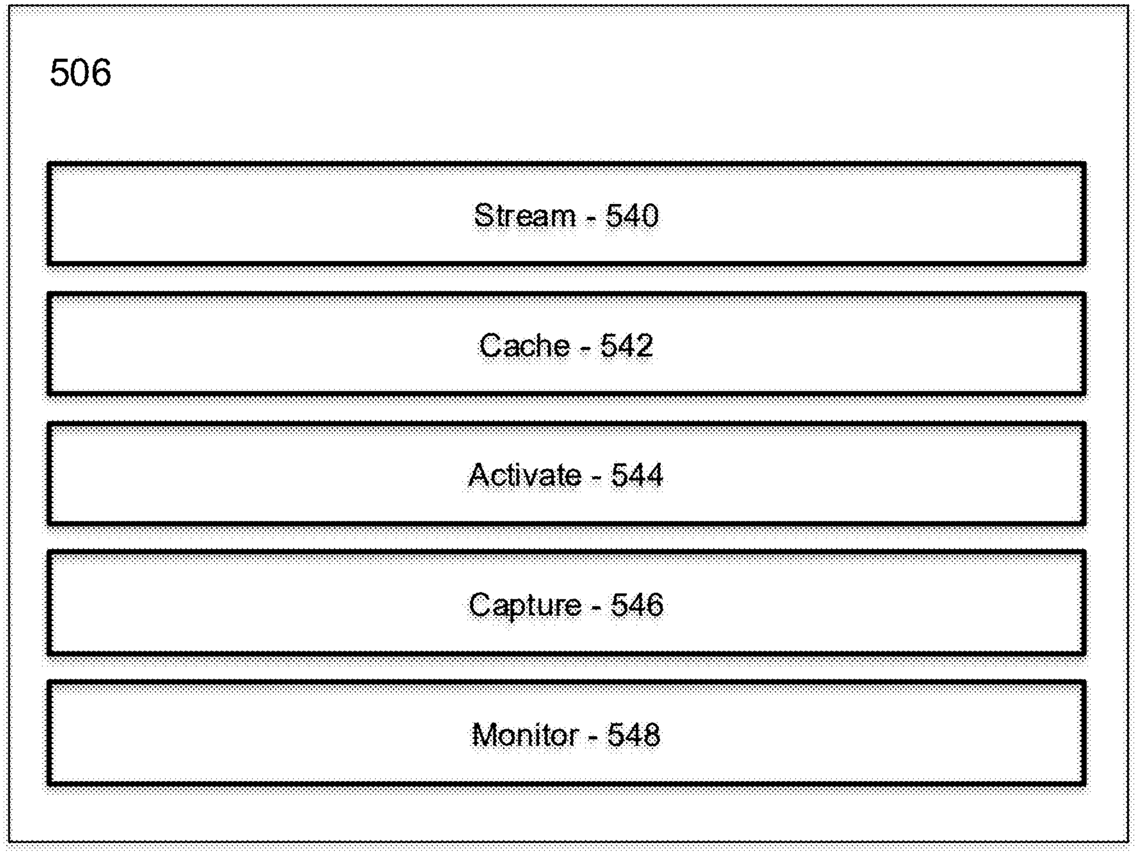
FIG. 5D shows a block diagram of an example localized processing and failover management system at the edge layer of FIG. 5, enabling localized caching, failover activation, and real-time user interaction processing.
Figure 5E:
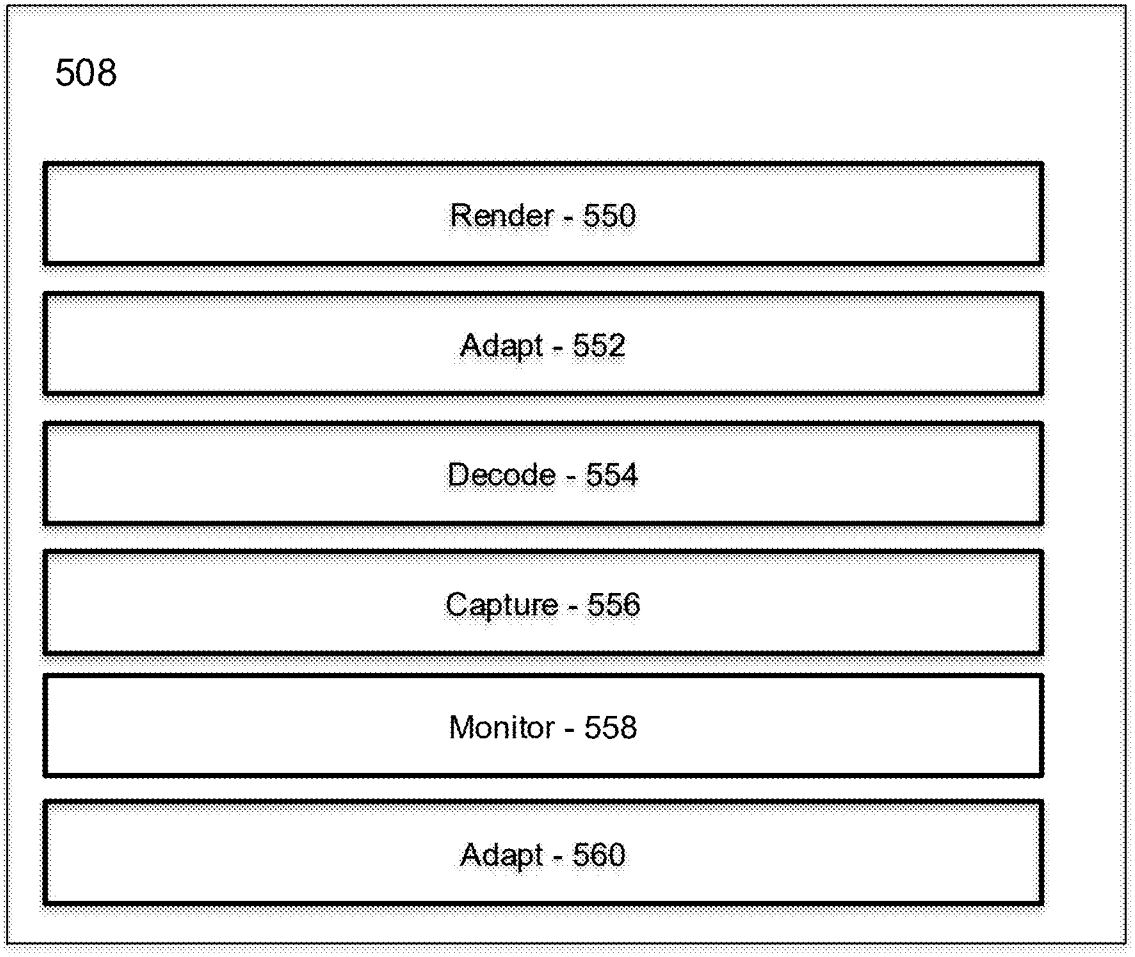
FIG. 5E shows a block diagram of an example rendering and user interaction system at the client device layer of FIG. 5, illustrating dynamic resolution adjustment, multimedia decoding, and user interaction capture with adaptive buffer size to minimize latency.
Figure 5F:
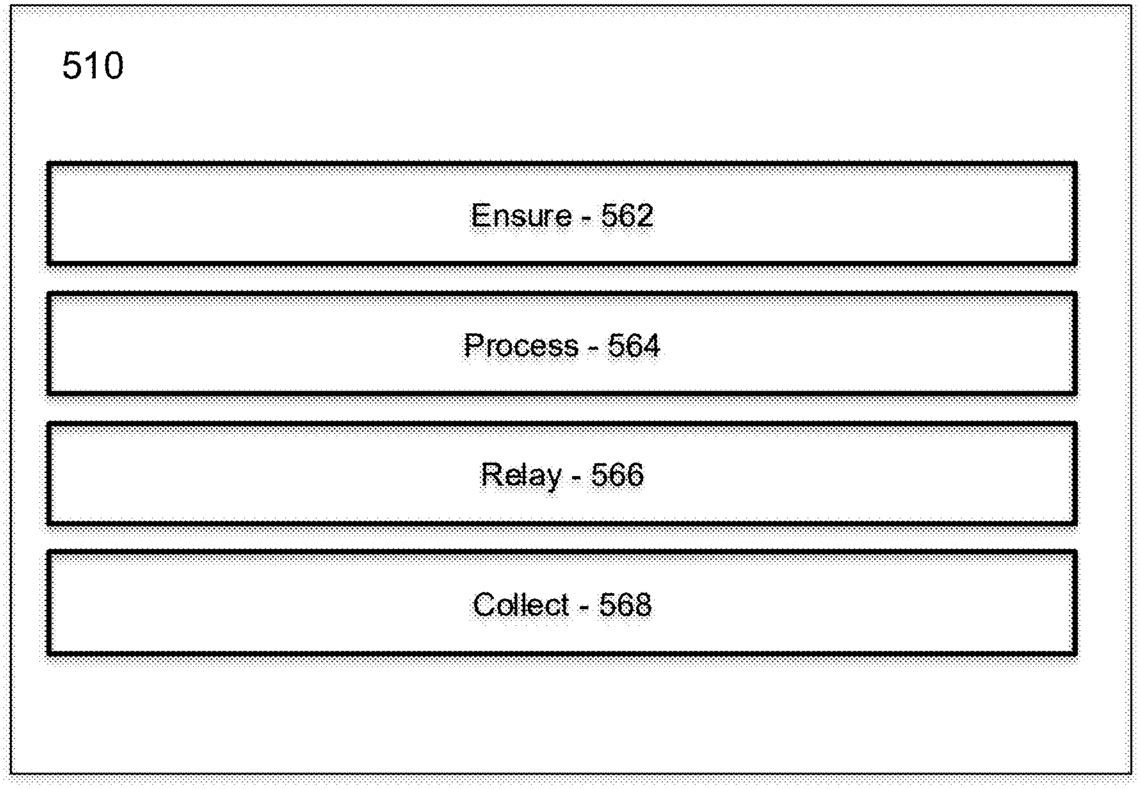
FIG. 5F shows a block diagram of an example real-time interaction loops operating across cloud, edge, and client layers of FIG. 5 to ensure synchronized rendering, interaction, and feedback.
Figure 5G:
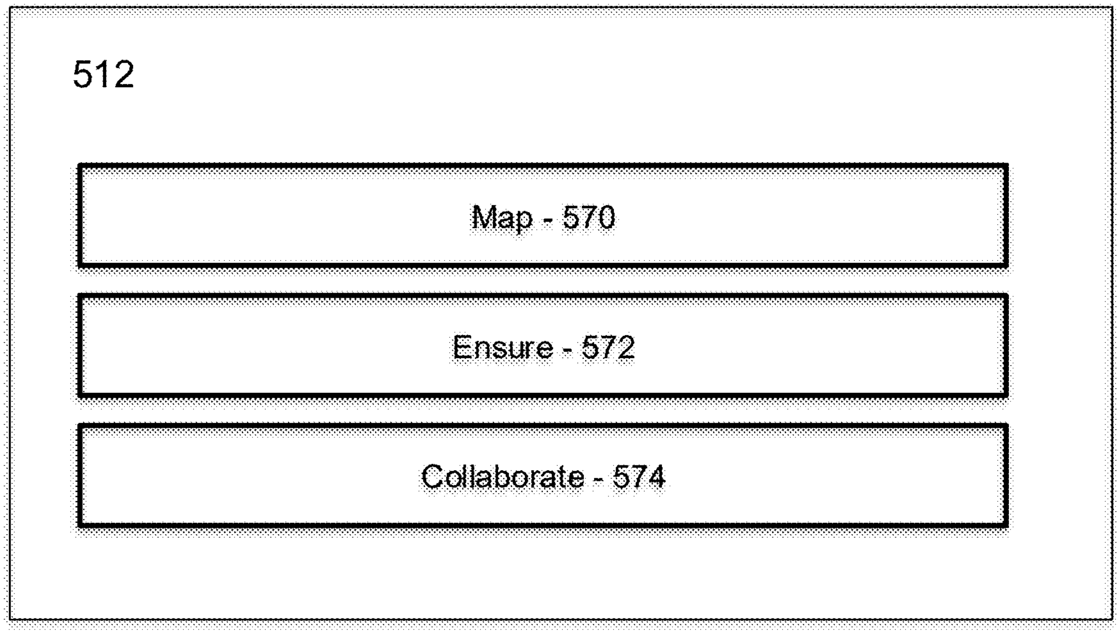
FIG. 5G shows a block diagram of an example virtual screen mapping and alignment system of FIG. 5, ensuring accurate mapping, orientation, and alignment of rendered content on client displays.
Figure 5H:
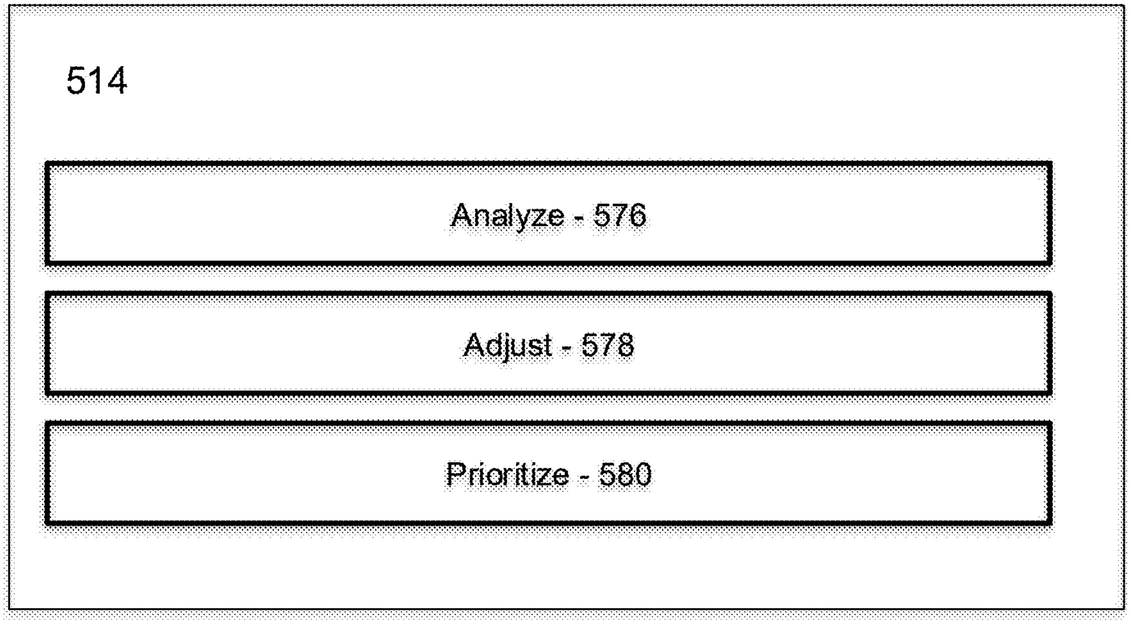
FIG. 5H shows a block diagram of an example virtual screen mapping and alignment system of FIG. 5, ensuring accurate mapping, orientation, and alignment of rendered content on client displays.
Figure 5I:
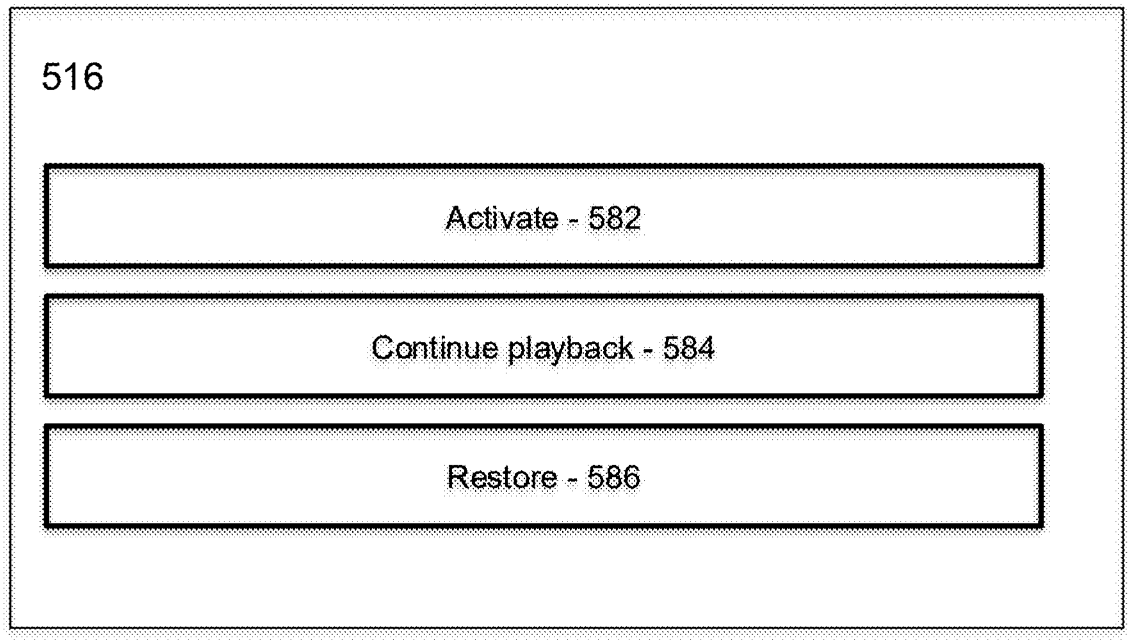
FIG. 5I shows a block diagram of an example adaptive resolution adjustment system of FIG. 5, dynamically optimizing resolution, frame rates, and compression based on real-time network conditions.
Figure 5J:
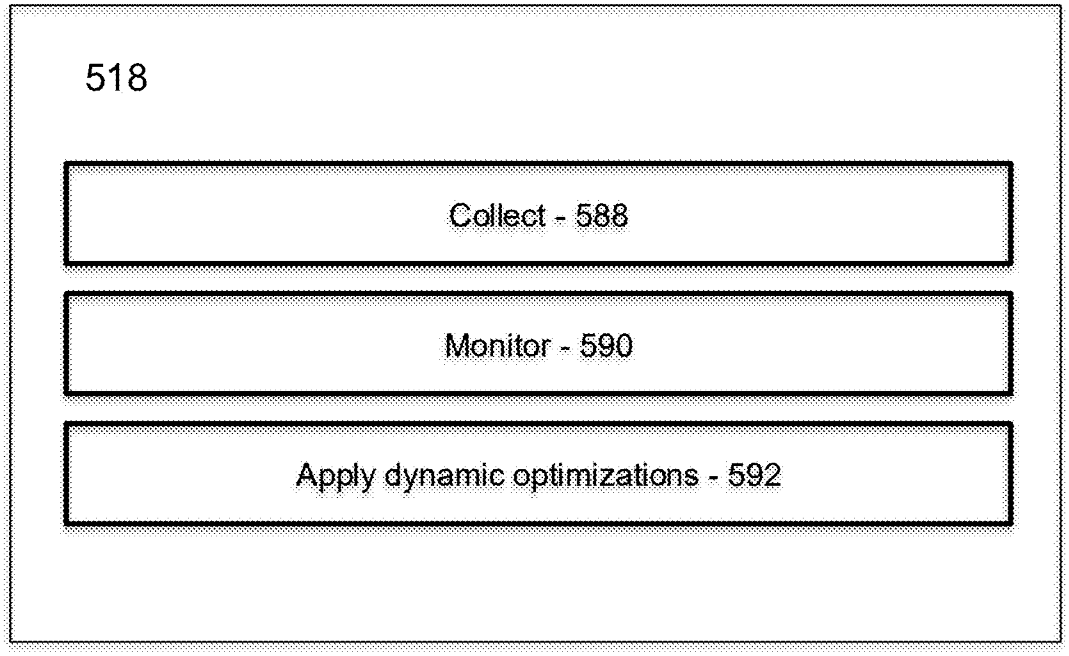
FIG. 5J shows a block diagram of an example failover activation system of FIG. 5, wherein preloaded content is activated locally to ensure uninterrupted content rendering during network disruptions.
Figure 5K:
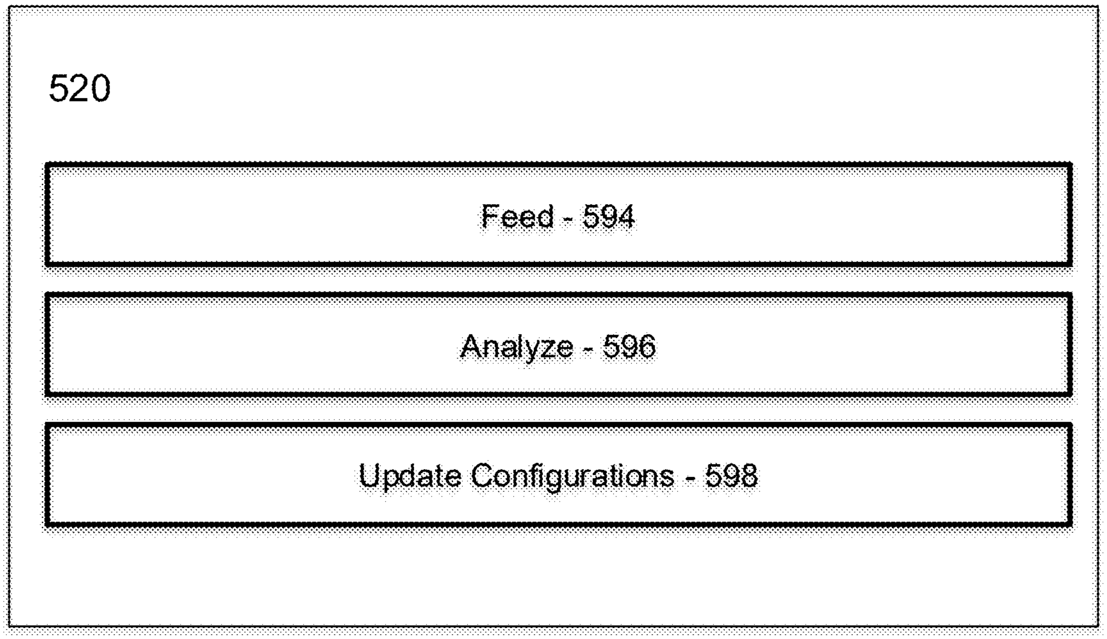
FIG. 5K is a block diagram illustrating an example iterative feedback and optimization process, including feed 594, analyze 596, and update configurations 598.
Figure 6:
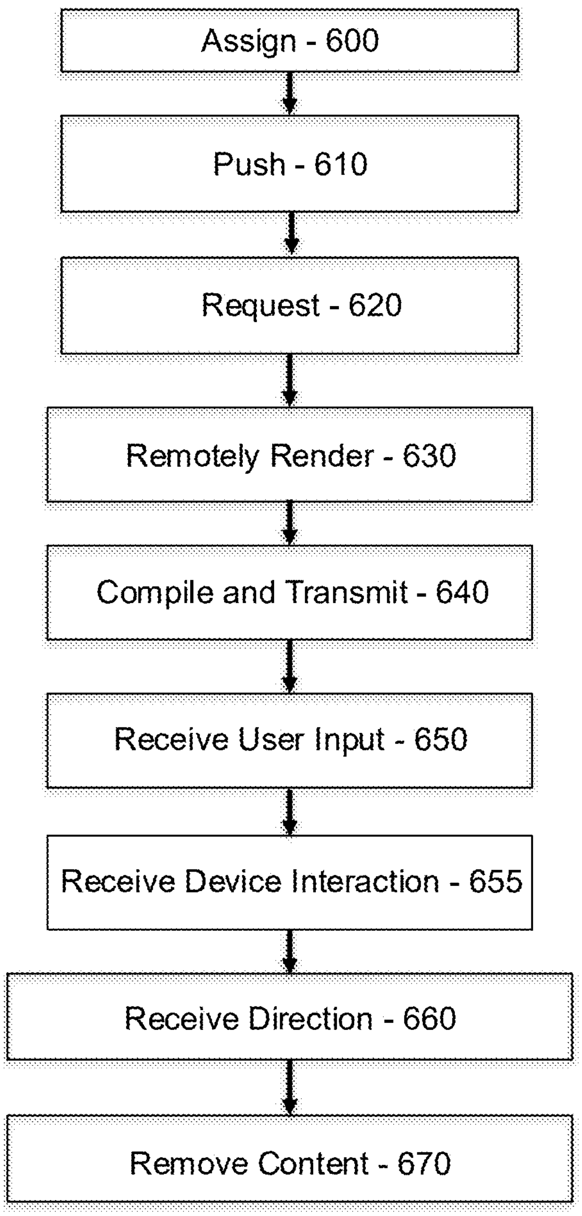
FIG. 6 shows a block diagram of an example method for remote rendering.

It should be noted that the disclosed examples, such as the examples of FIGS. 4-6, are intended to embrace numerous variations, including processes that may include actions in addition to those depicted in the figures, actions performed in an order different than those depicted in the figures, processes that include fewer blocks or operations than those depicted, as well as processes in which certain actions are performed concurrently with other actions. By way of example, the processes of FIGS. 4-6 may be performed utilizing the arrangements of hardware and software entities described in reference to FIGS. 1-3.

DETAILED DESCRIPTION

This disclosure provides computer-implemented methods and systems for remote rendering of content. In an example, content can be delivered across servers for rendering to edge devices and to client displays in a multi-tiered architecture. Example methods enable any one or more of real-time adaptability, fault tolerance, low latency, and high-resolution content delivery by integrating failover capabilities, virtual screen mapping, dynamic resolution adjustments, real-time performance feedback loops, and user interaction synchronization.

The methods and systems described in the present disclosure can be useful when delivering content to devices, such as those with limited processing capabilities. An example process can include activating multiple individual applications (e.g., browser windows application or graphical user interface (GUI) applications) using remote rendering software hosted on a server computer. The remote rendering software may stream content utilizing these applications (e.g., browser windows application or GUI applications) as sandboxed windows, in which a browser or GUI application runs separate from other browser or GUI applications, to various edge devices each having a display. In an example, content transmitted to a first display can be different from content transmitted to a second display. In an example, an edge device may include a "light client," which, in this context, means an application that relies on a server to execute a majority of processing and computation operations. Accordingly, use of a light client can reduce, or even eliminate, the need for extensive processing to render high-resolution content on a client display, thus overcoming the limitations of traditional digital signage and hospitality television solutions that require separate processing-intensive media players. In an example, an edge device can be equipped with an embedded System-on-Chip (SoC) player. In such an example, the server can execute an application for an individual client display, thus allowing individually tailored content to be rendered on display devices having resolutions that differ from one another. In an example, a client display can render high-resolution content that is streamed from the server even though the client display may include restricted capabilities compared to the server.

In an example, a system can include a server to execute stream player instructions for opening or activating multiple individual applications. Instructions executing on a server can map each application as sandboxed windows to a plurality of edge devices in which each edge device includes a display. In an example, an edge device may include an embedded processor for display of high-resolution content, thus overcoming limitations of traditional digital signage and hospitality TV solutions that utilize separate general-purpose media players. In an example, one or more of the client displays can include a built-in System-on-Chip (SoC) player. In an example, a server may execute an application for a client display, enabling varying content rendering utilizing client displays having differing resolutions.

In an example, stream player program instructions can be configured to render content on client devices. In an example, a system can utilize a resolution adaptation module for dynamically adapting the resolution of the content to accord with the display resolution of a particular client display.

A system may further include a media decoder compatible with SoC or media player configured to decode the content. The system can also comprise a content interaction interface configured to capture user interactions. The system may include a client device performance monitor configured to monitor the performance of edge devices and client displays. The system may be adaptable to diverse environments, supporting a variety of display types and facilitating upgrades to program instructions executed by the server. The system can be configured to render high-resolution content on display devices having limited performance. The stream player software can be configured to render content on client devices. The resolution adaptation module can dynamically adapt the resolution and orientation of the content. The system may further include a media decoder compatible with SoC or media player configured to decode the content. The system can also include a content interaction interface configured to capture user interactions. The system may include a client device performance monitor configured to monitor the performance of edge devices and client displays. The system may involve a multi-tiered computing architecture that includes at least one of the cloud servers, at least one of streaming processors, at least one edge devices, and at least one client display. The content optimization techniques performed by the system can include s, virtual screen mapping, dynamic resolution adjustment, real-time performance feedback, adaptive buffer sizing, and user interaction synchronization. The system may involve a multi-tiered computing architecture that includes at least one servers, at least one streaming processor, at least one edge device, and at least one client display. Optimization capabilities made possible by the system can include a failover capabilities, virtual screen mapping, dynamic resolution adjustments, real-time performance feedback, adaptive buffer size, and user interaction synchronization.

In an example, a computer-implemented method for displaying rendered content, can include receiving or receiving multimedia assets, including any one or more of video, audio, and interactive data, into a cloud server, wherein the cloud server preprocesses the assets by standardizing formats, applying encryption protocols, and providing compatibility with cloud servers. The method can additionally include the method can additionally include transmitting the preprocessed multimedia assets to a streaming and distribution layer, wherein a multi-input (MI) module can aggregate multimedia streams. The method can include a stream player decoding, compression, and optimizing the multimedia streams to form optimize content. The method can additionally include transmitting optimized content to an edge device server, wherein the edge device server caches the optimized content locally. The method can include a failover content module activating preloaded multimedia assets from local storage in response to a network disruptions. The method can additionally include rendering content on a client device via a stream player software, and dynamically adjusting resolution and compression based on device and network conditions. The method can additionally include capturing, by a content interaction interface, user interactions and establishing a synchronized rendering loop, an interaction loop, and a feedback loop between the cloud server. The method can additionally include mapping an edge device and a client device to align multimedia streams on the client device. The method can additionally include analyzing real-time network conditions and device capabilities via the resolution adaptation module to adjust resolution, frame rate, and compression parameters. The method can additionally include dynamically adjusting the buffer size during user interactions with the client device via the resolution adaptation module and stream generation module. The method can additionally include using a failover content module to activate preloaded multimedia assets from edge device storage when network connectivity is disrupted or latency thresholds are exceeded.

In an example, the method can additionally include collecting performance metrics, analyze data, and apply optimizations across, streaming, edge, and the client device, and conveying performance metrics and usage data back to the cloud server, analyzing feedback from the feedback loop, and dynamically updating system configurations.

In an example, the multi-input (MI) module aggregates data streams from live feeds, cloud sources, and metadata sources.

In an example, the failover content module is triggered in response to detecting network disruptions beyond predefined latency threshold.

In an example, the resolution adaptation module dynamically adjusts resolution settings based on real-time bandwidth availability and hardware performance metrics of the client device.

In an example, the performance monitoring includes tracking latency, compression efficiency, error rates, and resource utilization metrics.

In an example, the feedback loop transmits real-time performance metrics from the client device to the cloud server for iterative optimization.

In an example the iterative optimization includes dynamically reconfiguring compression levels, bitrate allocation, and content priority based on collected performance data.

In an example the virtual screen mapping can ensure accurate window alignment across at least one additional client device that is heterogeneous to the client device with varying display resolutions and aspect ratios.

In an example, the streaming and distribution layer dynamically reroutes network traffic to reduce latency and congestion during content delivery.

In an example, the dynamically adjusting of the buffer size includes reducing the buffer size based on the user interactions with the client device.

In an example, dynamically adjusting the buffer size includes increasing the buffer size based on an absence of the user interactions with the client device.

In an example, a computer-implemented method for delivering content across a multi-layer network system, can include receiving or receiving multimedia assets for storage into a cloud-based repository. The method can additionally include preprocessing and optimizing the assets within the cloud-based repository, dynamically adjusting parameters based on real-time performance metrics collected via a statistics collection module. The method can additionally include distributing the optimized assets to edge devices via a streaming layer. The method can additionally include caching multimedia streams locally on edge devices, and activating pre-loaded failover content from local storage via a failover content module in response to network disruptions or latency thresholds exceeding a predetermined value. The method can additionally include rendering content on client displays using a virtual screen or frame buffer, capturing and processing user interactions from a plurality of client devices via a device interaction loop, relaying these interactions to the cloud-based repository for real-time responses, and dynamically adjusting resolution, bitrate, and compression settings based on network conditions, device capabilities, and real-time performance metrics obtained from one of the plurality of client devices. The method can additionally include implementing iterative feedback loops across cloud, edge, and client layers for continuous monitoring, optimization, and dynamic reconfiguration of streaming workflows.

In an example, the virtual screen can dynamically modify media rendering.

In an example, the statistics collection module includes periodic performance analysis and provides insights into iterative optimization of streaming parameters.

In an example, a system for delivering content to client displays includes a cloud server configured to ingest or receive, preprocess, and optimize multimedia assets. The system can additionally include a streaming server communicatively coupled to the cloud server and configured to aggregate, decode, compress, and distribute multimedia streams. The method can additionally include an edge server communicatively coupled to the streaming server and configured to perform localized processing, caching, and failover management. The method can additionally include a plurality of client displays, each equipped with a System-on-a-Chip (SoC) player and communicatively coupled to the edge server, wherein each client display configured to render content received from the edge server.

The streaming server of the system can include a Multi-Input (MI) module to aggregate multimedia streams from multiple sources, a stream player to decode, compress, and optimize multimedia streams, a multi-output (MO) module to distribute optimized streams to the edge server, and a window grabbing module to arrange and manage content windows for efficient distribution.

In an example, the edge server can include a localized processing module to execute caching and real-time user interaction, a stream generation and resolution adaptation module to dynamically adjust buffer size for zero latency during user interaction and increased latency while user is non-interacting for best visual performance, a failover management module to activate preloaded content in case of network disruptions, a router to manage network pathways and optimize traffic and a feedback loop to transmit performance metrics back to the cloud server.

In an example, each client display can include an SoC player, a virtual screen to display content, a local rendering module to decode and render content, and a user Interaction module to capture and process user interactions.

In an example, the system can additionally include a central management system configured to monitor performance, dynamically adjust resolution, frame rate, and compression, and implement iterative feedback loops.

As used herein, the following apply:

The term "administer" means to remotely generate content for display. A display can include a signage screens, a hospitality TVs, etc.

The term "application" means a set of computer-executable instructions that permit a computer to perform an operation. An application can encompass a standalone GUI-based program, a browser window, etc. that facilitates user interaction with Internet-based or local resources.

The term "client display device" means a portion of a client-side system architecture in a client-server model. The client display device may have limited or no processing capabilities other than those involved in the display of content. In an example, a client display device can include a SoC for controlling displays with a built-in remote rendering capability. In another example, a SoC can combine multiple components of a computer system (CPU, GPU, memory, and I/O controllers) into a single chip, for controlling displays with an embedded player.

The term "client" means a device, application, or system that couples to a server over a network and which requests and consumes services, data, or resources provided by a server. A client can include an entity that interacts with a server to receive or display content, perform operations, or execute tasks. A client can include a software application or hardware device that communicates with a server over a network. The client may request data, process the data, and display the results. To perform remote rendering, the client may fetch video, audio, or other media content from the remote rendering server and present the content via a stream player. A client may include a heavy client (described hereinbelow) or a client may include a light client (described hereinbelow).

The term "client-originated event" means any signal, command, or data packet generated by user interaction, system processes, or an application that originates at or is initiated by a client-side component, such as an edge device client, a virtualized interface (e.g., virtual screen), or a local server instance, and is processed by the client device or transmitted upstream to a remote rendering server for interpretation, action, or response execution, including but not limited to hardware control (e.g., printing), UI updates, or telemetry reporting.

The term "device client" means an edge device or a display device. In some examples, the display device may include a SoC device.

The term "device-originated interaction" means any signal, command, or data transmission generated by a process, component, or logic executing on a client-side device, such as an edge device, local server, or virtual interface, which is not initiated by user input. Such interactions may include server-triggered instructions received at the client device (e.g., print commands, UI refresh instructions, etc.), sensor-activated signals (e.g., a proximity sensor, a temperature trigger, etc.), application-generated updates, and/or automated responses initiated by instructions executable by a client. Server originated interactions may be received from or generated locally by device-executed software modules, and are distinct from user-initiated interactions.

The term "edge device" means a computing device that is located at the edge of a network, such as proximate to an end user, a client, or a data source located at the network edge. Such devices may act as intermediaries between the end-user devices (e.g., smartphones, smart TVs, laptops) and centralized servers or cloud infrastructure. An edge device may display renderable content (e.g., videos) by caching or pre-processing data locally.

The term "external player" means a software application or hardware device to render content (e.g., video, audio, web/html content, etc.) that may be independent from the primary application or platform providing the content. Software-based external remote rendering devices may include applications installed on devices to execute content rendering. A hardware-based external player includes physical devices to process and output content. A web-based external player can include browser plugins or standalone browser windows to render content.

The term "GUI Application" means computer-executable instructions with graphical user interface that can be executed/rendered on an operating system executed on a local server.

The term "heavy client" means an application that performs most of the processing and computation at a client. A heavy client may interact with the server primarily for data retrieval, storage, and/or occasional updates.

The term "light client" means an application that relies on a server to execute most of the processing and computation. A light client can primarily serve as an interface for user interaction. In an example, a light client executes processing tasks exclusively for rendering content and receiving input signals from a user interface of a client.

The term "local server" means a server operating within an enterprise. In an example, a local server can include a server that is remote from a location housing a device client.

The term "processing resource" means a computing resource that is onsite (proximate with device client). In an example, a processing resource can be an enterprise processing resource that is remote to the location housing the device client to provide computing resources to serve a client device within an enterprise.

The term "render" means processing data into for output to a display. Rendering can apply to any of various media types. Rendering may occur on a virtual screen on a server or to an actual screen or display, unless specifically stated otherwise.

The term "server" means a local or cloud server, unless specifically referred to otherwise. The server can execute instructions for any operating system such as, but not limited to, Linux, Windows or MacOS. A server can be utilized multiple platforms rather than a single platform. The content can be either browser based or may be based on another application that is native to a server operating system.

The term "SoC" means a System on a Chip, which combines multiple components of a computer system (CPU, GPU, memory, and I/O controllers) into a single prepackaged chip.

The term "software" means one or more computer instructions executable by a processor.

The term "stream player" means (unless specifically stated otherwise) means a content player that remotely renders content or a device that enables the playback of content audio, video, or live broadcasts transmitted over the internet or a local network. A stream player (i.e., a content player or device for remote rendering) may include a software application, hardware device, or embedded tool used to receive, decode, and display or present content (such as video or audio) delivered via a continuous data stream over a network (e.g., the Internet), and which can execute real-time playback of streaming media without requiring the end-user to download the entire file prior to content presentation or playback.

The term "virtual screen" means a "virtual frame memory buffer" or "memory."

The resolutions may include different values.

A client display may include different types.

A client display may include varying resolutions. A first resolution may be lower resolution such as 720p, and the second resolution may be higher resolution such as 4K, 8K, 16 K, etc.

Stream player software may accommodate upgrades of client displays from a first resolution to a second resolution.

Varying content may include different types of content, such as still frames, videos, audio, computer-generated graphics, etc.

The term "browser" means a software application, system, or platform that enables users to access, retrieve, render, and interact with web-based content, including but not limited to websites, web applications, cloud-based services, or other online resources. A browser may support various web technologies such as Hypertext Markup Language (HTML), Cascading Style Sheets (CSS), JavaScript®, and other scripting or programming languages. A browser may operate on any computing device, including but not limited to personal computers, mobile devices, embedded systems, or digital signage platforms. The term "browser" encompasses all types, forms, and variations, including but not limited to standard web browsers, headless browsers (i.e., a web browser that does not include a graphical user interface), kiosk-mode browsers, or custom-built browsers for specific applications.

An individual application, such as an individual browser window or GUI Application may be configured to render in one or more resolutions.

An individual application, such as an individual browser window or GUI application may be configured to be rendered with varying content.

The disclosure provides examples of computer-implemented methods and systems for delivering content to remotely located devices. In an example, a system can include a server executing one or more programs for remote rendering software, which may open multiple individual browser windows or GUI Applications. These windows can be displayed as sandboxed windows to one or more displays in cooperation with an edge device client with a remote rendering device. The server can prepare an application for each client display, allowing content to be rendered in one or multiple resolutions and with varying content. The client displays can display or render high-resolution content transmitted from a server, overcoming restricted processing capabilities of a client display.

Remote rendering software may accommodate upgrades of client displays from a first resolution to a second resolution, such as from 720p to 4K, 8K, 16 K, or another resolution. Accordingly, remote rendering software can be used by an enterprise to display content at a resolution of, for example, 4K, on devices that otherwise lack the performance capabilities to deliver content of such resolutions. In an example, a system for remote rendering may be implemented with hardware and/or may be software-based with the underlying hardware depicting the overall architecture. Methods and systems described herein can be applied in various settings, such as quick service restaurants ("QSR"), department stores, airports, or other locations that utilize multiple displays, allowing for mixed types of displays and easy upgrade.

Exemplary Operation of a Method and System

Figure 1:
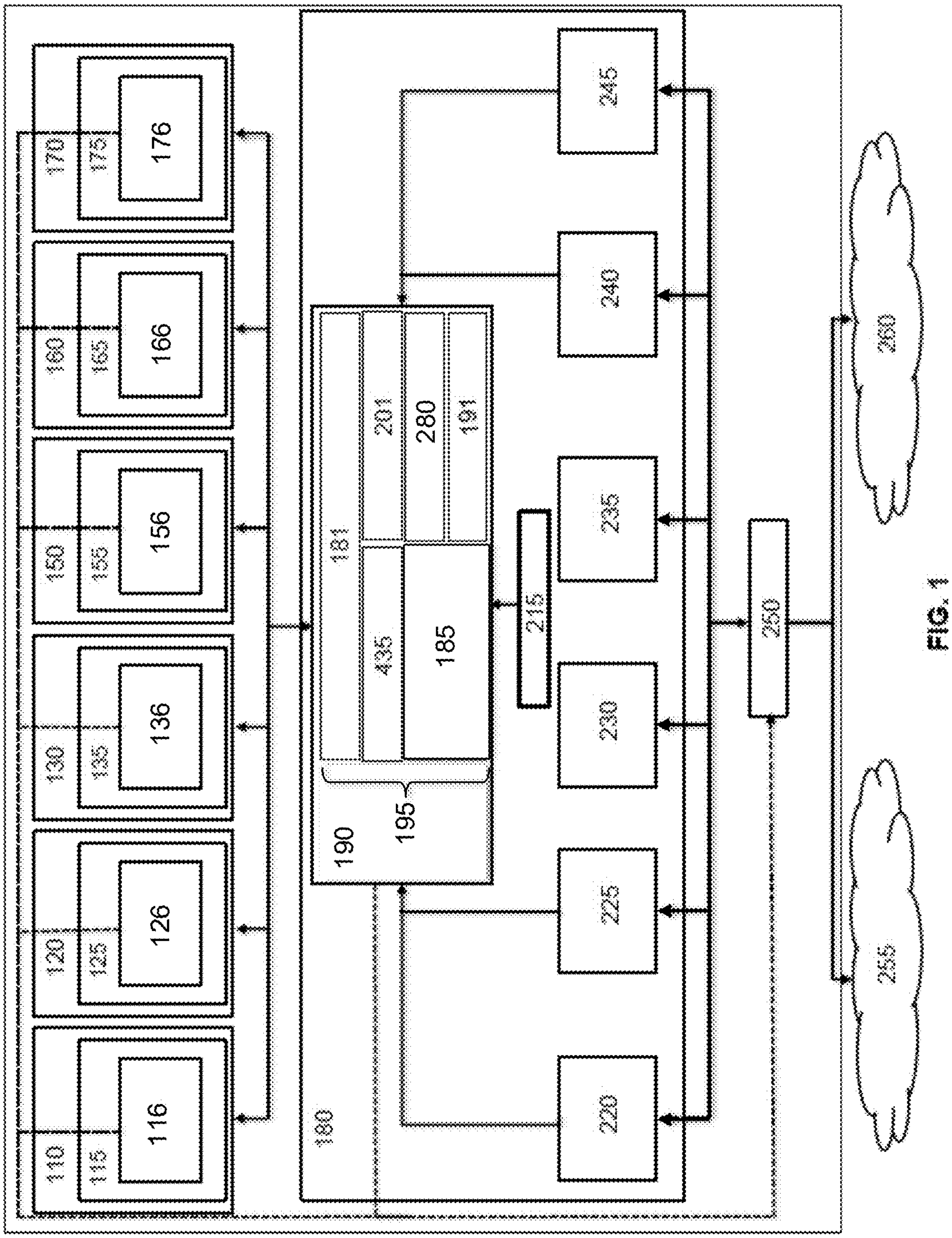
FIG. 1 is a block diagram of an example system for remote rendering of content.

As illustrated in FIG. 1, a multi-input (MI) and multi-output (MO) remote rendering architecture can deliver real-time content to edge devices. As shown in FIG. 1 each edge device (115-135) and each kiosk (155-175) includes a light client (e.g., 116, 126, 136, 156, 166, and 176). Each of edge devices 115-135 and kiosks 155-175 includes a display (110, 120, 130). In FIG. 1, displays 110, 120, and 130 may include displays in a department store, for example, while displays may be included in a kiosk setting, such as in a quick service restaurant. Browser or GUI application instances (220, 225, 230, 235, 240, 245) can generate content routed router 250, which originates from cloud-based management services 255, 260. The system of FIG. 1 can utilize external player 180, which can include an operating system, to enable content to be rendered at each of edge devices 115-135 and kiosks 155-175. In an example, external player 180 can operate as a central hub for managing input streams, processing content, and distributing optimized outputs to various endpoints, while leveraging cloud-based management services (e.g., cloud-based management services 255, 260) for seamless control and synchronization.

The system of FIG. 1 may begin with content ingestion and storage at one or more of cloud-based management services 255, 260, which can serve as the primary repository for assets, including video, audio, and interactive content. Cloud-based management services 255, 260 provides up-to-date media files and dynamically pushes updates to each of edge devices 115-175. Simultaneously, cloud-based management services 255, 260 monitors system health, device performance, and operational analytics, providing administrators with actionable insights and control over the system of FIG. 1.

External player 180, utilizing an operating system, can act as a processing hub of the system of FIG. 1, which can include coordinating incoming streams and managing outputs. Incoming data from cloud-based management services 255, 260 flow from router 250 can flow into the multi-input module (MI, 195), which may aggregate multiple video, audio, and interactive streams from diverse sources, including live feeds, cloud repositories, and direct device connections. These streams can be subsequently captured and refined by window grab module 185, which can prepare both live and pre-recorded media for rendering.

After streams are input and aggregated, stream player 190 performs initial processing, including decoding, compression, and quality optimization, to ensure compatibility among edge devices 115-135 and kiosks 155-175 and browser or GUI application instances 220-245. Window grab module 185 can then capture and arrange content windows, enabling accurate alignment of media streams across edge devices 115-135 and kiosks 155-175. Stream player 190 can further serve as a traffic controller (e.g., a gating function) for managing the interaction between processed streams and browser or GUI application instances (220, 225, 230, 235, 240, 245), by dynamically allocating content windows based on pre-set configurations and real-time requirements.

Processed media streams can be conveyed through multi-output module 195, which can ensure distribution across edge devices 115-135 and kiosks 155-175. At this stage, router 250 facilitates network communication between external player 180, browser or GUI application instances (220, 225, 230, 235, 240, 245), and edge devices (115, 125, 135) and kiosks (155, 165, 175). Router 250 can ensure minimal latency, load balancing, and uninterrupted data flow across system components, such as those depicted in FIG. 1.

Each browser or GUI application instance (220, 225, 230, 235, 240, 245) can serve as a dedicated rendering environment, receiving streams from external player 180 via router 250. These browser instances or GUI application instances may decode and prepare multimedia streams for rendering. Window gate 215 can ensure that content streams are accurately displayed in a sandboxed manner within their respective browser environments, meaning displayed without overlap among browser environments and/or misalignment. Window gate 215 ensures that content streams can be transmitted to edge devices (115-135) and kiosks (155, 165, 175, etc.), which are responsible for decoding the streams locally and preparing the streams for rendering on their respective output devices.

At an output stage, content can be displayed on displays 110, 120, 130 and kiosks 150, 160, and 170. Each display or kiosk can operate in synchronization with its paired edge device (115, 125, 135) or a paired kiosk (155, 165, 175), which may ensure low-latency content delivery, frame accuracy, and consistent quality. In an example, each of displays 110, 120, 130 can present static or dynamic multimedia presentations, while one or more of kiosks 150, 160, and 170 may offer interactive capabilities, such as touch-based navigation or user-specific content rendering.

Throughout the content streaming/rendering process of FIG. 1, management and monitoring module 181 may track the operational health and performance of each of edge devices 115-135 and kiosks 155-175 for each input stream. Management and monitoring module 181 can additionally perform real time adjustments to an output stream by dynamically modifying compression levels, bitrate allocations, and resolution settings based on available bandwidth, device performance, and content priority. Based on a presence of discrepancies, errors, or inefficiencies are detected, feedback can be transmitted to cloud-based management services 255, 260, at which corrective measures can be taken such as increasing or decreasing the compression level, increasing or decreasing a bit rate allocation, etc.

Simultaneously, cloud-based management services 255, 260 may continue to provide regular updates and synchronization signals to ensure that content remains up to date. Accordingly, a feedback loop between management and monitoring module 181 and cloud-based management services 255, 260, can represent an iterative process ensures a continuous loop of monitoring, optimization, and feedback across the components of FIG. 1.

The integration of these processes of FIG. 1 can result in a scalable, reliable, and adaptable streaming infrastructure. External player 180, which includes multi-input and multi-output 195 capabilities, can act as a central component of the system, such as by coordinating incoming streams, managing intermediate processing, and controlling outgoing distribution. Router 250 can ensure seamless communication, while browser instances or GUI application instances (220, 225, 230, 235, 240, 245) execute local rendering, which permits an edge device or a kiosk to render content.

In an example, management and monitoring module 181 intermittently or periodically monitors bandwidth utilization, adjusting minimize latency and adapting buffer size.

Client device performance monitor 191 collects real-time performance metrics from each display, such as frame rates and CPU utilization. These metrics are fed back to adaptive content delivery engine 201, which dynamically adjusts remote rendering parameters such as bitrate, resolution, and compression.

Throughout remote rendering of content, administrators can interact with the content via a content rendering control interface allowing remote commands such as start, stop, and pause and user interactions. End-users at the client displays can also interact directly with the streamed content through a content rendering control interface.

FIG. 1 is a block diagram of an example system for remote rendering of content. The system of FIG. 1 can include cloud-based management services (255, 260), which may operate to monitor performance and ensure content availability, version control, and proactive system optimization. Real-time stream control (205) operates to maintain efficiency and responsiveness in dynamically changing conditions, which may include fluctuating network bandwidth or hardware resource constraints.

The system of FIG. 1 provides an end-to-end solution for multi-stream management, processing, and delivery, integration of cloud-based services, advanced routing, and real-time optimization. Components, from the cloud-based management services 255, 260 to edge devices 115, 125, 135 or to kiosks 155, 165, 175 may operate collaboratively to ensure seamless, low-latency, and high-quality content delivery across multiple displays and kiosks. The system of FIG. 1 can allow scalability for future applications, thus making the modular design suitable for environments ranging from retail kiosks and public information systems to advanced multimedia broadcasting setups.

In the example of FIG. 1, a multi-tiered content streaming and management architecture operates to optimize delivery, rendering, and interaction of content across diverse end-user devices. This system of FIG. 1 integrates cloud-based management services (255, 265), edge devices (115, 125, 135) or kiosks 155, 165, 175), administrator controls via cloud-based management services 255, 260. In the example of FIG. 1, user interaction module 280 receives input signals from edge devices 115-135 and kiosks 155-175, which can include user selections. In an example, an edge device (e.g., kiosk 150) a user selection for a food item in a quick service restaurant. The user selection can be conveyed through user interaction module 280 to display additional items that may complement the selected food item. Accordingly, the system of FIG. 1 can form a framework capable of dynamic content rendering, real-time responsiveness, and adaptive content distribution.

Multi-input and multi-output module 195 can operate as an aggregator and distributor within the system of FIG. 1. Module 195 can collect inputs from cloud-based management services 255, 265, user interaction module 280, and edge devices 115, 125, 135) or kiosks 155, 165, 175. Inputs can be aggregated into streams for optimized distribution. Multi-input and multi-output module 195 can subsequently execute output distribution, ensuring efficient stream flow to stream player 190 and window gate 215 for rendering and alignment.

Window gate can capture and arrange content windows, enabling accurate alignment of content frames across displays 110, 120, 130 and kiosks 150, 160, 170. Window gate 215 can serve as a traffic controller, managing interaction between processed streams and browser or GUI application instances (220, 225, 230, 235, 240, 245). Browser or GUI application instances can act as dedicated rendering environments, receiving processed streams and presenting the processed streams accurately.

Content can be displayed on displays (110, 120, 130) and kiosks (150, 160, 170) in a manner that operates in synchronization with their paired edge devices (115, 125, 135) or kiosks (155, 165, 175), which may result in low-latency content delivery, accurate frame alignment, and consistent quality.

Figure 2:
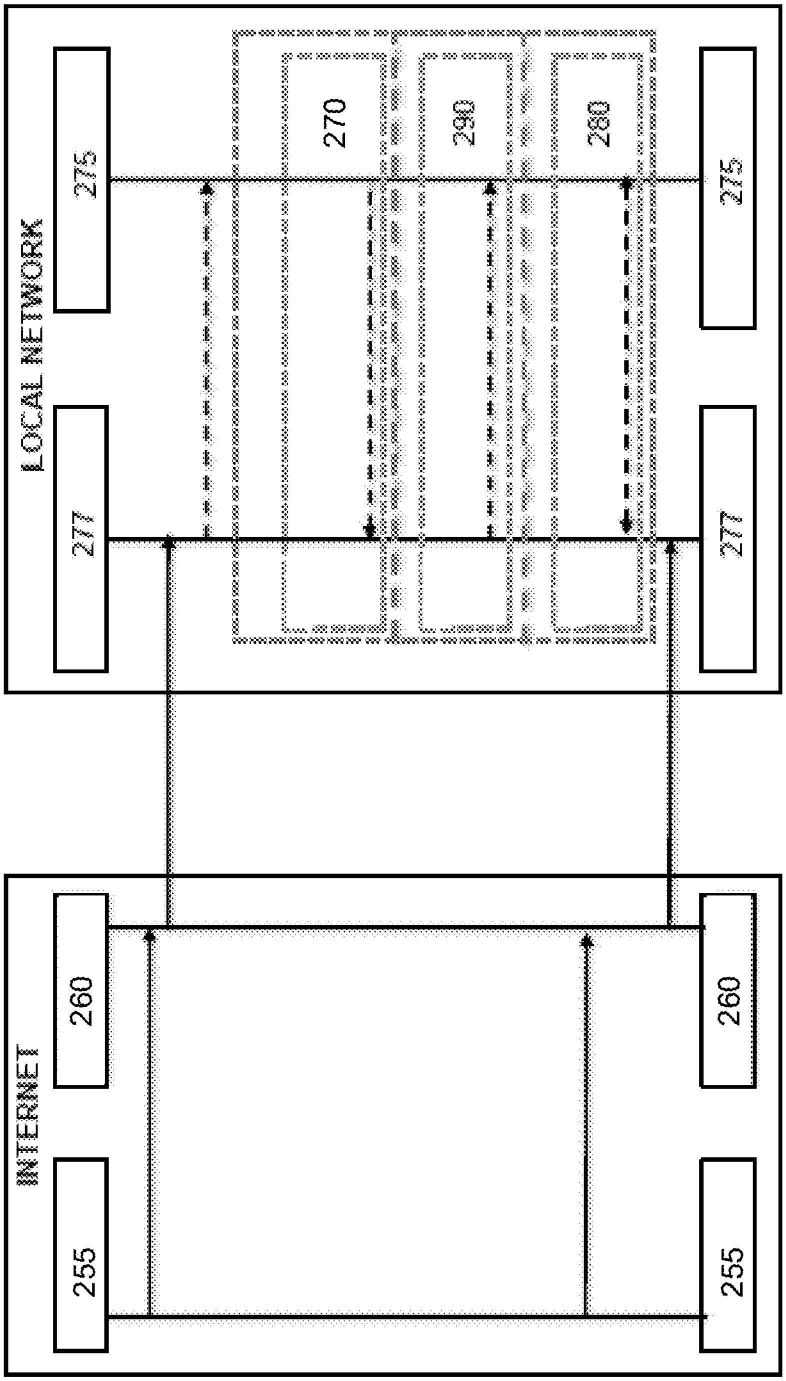
FIG. 2 is a block diagram of an example content delivery system using cloud and local network components.

FIG. 2 is a block diagram of an example content delivery system using cloud and local network components. Edge device client local server 275 and cloud-based management services 255 and 260 can execute core processing and management, while edge device client 277 and user interaction module 280 can ensure localized processing and responsiveness. Integration of feedback loops, dynamic rendering tasks, and cloud-edge-device interaction can bring about a high-performance system for real-time content delivery, making the system of FIG. 2 suitable for retail displays, interactive kiosks, and large-scale public information systems.

At a high level, one or more of cloud-based management services 255, 260 can operate as a hub for content configuration and administrative control. Services 255, 260 can assign, deliver and remove content configurations across components of FIG. 2. Content configurations, including multimedia assets and rendering parameters, can be dynamically pushed or replaced as needed, thus enabling administrators to maintain control over system operations in real time.

As shown in FIG. 2, edge device client 277 can be communicatively coupled to the cloud-based management services 255 and 260. Edge device client 277 can operate as an intermediate processing and storage unit. Accordingly, edge device client 277 can execute dynamic media rendering via content rendering module 270, frequent caching of accessed assets, and responding to remote rendering requests. Edge device client 277 can further execute remote rendering tasks on behalf of devices lacking sufficient computational power. These tasks can operate on an every-frame rendering loop, which can ensure synchronized updates for media playback across devices. Furthermore, the edge device client 277 can collect periodic statistical data from connected devices, monitor performance metrics, network latency, and rendering quality. This feedback can be relayed back to one or more of cloud-based management services 255, 260 for analysis and optimization.

Local server 275 operates as an interface between the cloud-based management services 255, 260 and edge devices, such as edge devices 115-135 and kiosks 155-175 of FIG. 1. Local server 275 can be tasked with processing media streams locally, managing caching, and optimizing delivery to client devices. Additionally, local server 275 captures user interaction inputs from connected devices, such as touch commands, click interactions, or gesture-based inputs, and inputs the user interaction inputs into a real-time rendering pipeline. This localized processing reduces latency and ensures seamless content rendering.

Bidirectional device interaction and user interaction module 280 operates at a device layer to capture real-time user inputs and to relay the user inputs two local server 275 for immediate interaction and feedback. These inputs are dynamically fed or conveyed to the rendering pipeline, which may enable the system to adapt content playback in response to a user input. User interaction module 280 can operate on a continuous loop, ensuring that user commands are recognized and acted upon, whether such user commands are transmitted back to local server 275 or escalated to one or more of cloud-based management services 255, 260 for further processing.

As shown, the system of FIG. 2 can include statistics collection loop 290, which can periodically or occasionally gather performance metrics, including frame rates, error counts, and latency levels. These statistics are relayed back to cloud-based management services 255, 260, where adjustments can be made dynamically to adjust frame rates, compression levels, and/or resolution settings. Accordingly, statistics collection loop 290 operates as a feedback loop to ensure that content delivery remains consistent, even in environments with fluctuating network conditions or hardware constraints.

As noted above, the system of FIG. 2 architecture includes three operational loops: content rendering module 270, user interaction module 280 (i.e., bidirectional device interaction and user input), and statistics collection loop 290.

Content rendering module 270, content may be updated and synchronized on a per-frame basis, which can ensure seamless media playback across devices. User interaction module 280 can ensure that user inputs can be monitored and reflected in real-time, while statistics collection loop 290 facilitates ongoing monitoring, reporting, and optimization of performance metrics.

Content can flow through the system in a structured manner: content assignments originate from one or more of cloud-based management services 255, 260 and can be processed by local server 275 and either rendered remotely or passed to edge device client 277 for local rendering and caching. At the same time, user inputs input to user interaction module 280 can be transmitted back into content rendering module 270, thus facilitating a two-way interactive experience.

The system of FIG. 2 can integrate local processing, cloud-based rendering, failover capabilities, and user interaction modules into a cohesive and adaptable streaming system. By leveraging dynamic configuration management, real-time optimization loops, and fault-tolerant protocols, the system can ensure low-latency playback, reduced resource waste, and uninterrupted media delivery across edge devices.

FIG. 3 is a block diagram showing an example system for rendering content to devices with limited capabilities. FIG. 3 includes an edge device media processing and interaction system to optimize content rendering, failover handling, client originated events, and resource management at edge device client 277. The system of FIG. 3 can integrate virtual screen 300, local servers 305, remote rendering controls implemented at module 315, and interactive feedback loop 335 to deliver a fault-tolerant, highly responsive, and adaptive streaming experience on edge devices.

FIG. 3 illustrates a robust edge device media processing and interaction system that combines reliable failover content handling, optimized media rendering, and real-time interaction processing into a seamless workflow. The system may be particularly well-suited for deployment in interactive kiosks, digital signage networks, hospitality TVs, and localized multimedia environments, where performance, resilience, and responsiveness are paramount. This modular design can enable scalability and adaptability, thus allowing the system to address diverse operational requirements efficiently.

The system of FIG. 3 includes edge device virtual screen 300, which can function as a virtualized display environment for rendering and managing content such as browser windows or GUI applications. This virtual screen can serve as an intermediate output layer, executing media decoding, rendering tasks, and failover content display, ensuring a seamless viewing experience even during disruptions. As used herein, edge device virtual screen 300 can represent a virtual frame buffer or memory. In an example, edge device virtual screen 300 represents a memory array and is not displayed via a display device. Thus, content displayed represents a mapping from the virtual server to the client device and the screen of the device client.

Supporting edge device virtual screen 300 is local server 305, which can operate as a central processing unit at an edge device, such as edge device client 277. Local server 305 executes tasks such as content requests, local media rendering, caching operations, and failover execution. Via local server 305, the system of FIG. 3 can dynamically switch between local and remote rendering paths, thus maintaining performance stability across varying network conditions.

Local network 310 establishes a communication bridge between edge device client 277 and remote/cloud servers. Local network 310 content requests, configuration updates, and bidirectional communication sessions, which can enable data flow across system of FIG. 3. In examples in which remote resources are utilized, request content remote rendering (315) module can initiate rendering tasks utilizing local server 305. Local server 305 can process the content and return remotely rendered content 320 to edge device client 277. The remotely rendered content can undergo additional refinement at edge device client 277 prior to virtual display on virtual screen 300.

To facilitate performance reliability, statistics module 325 can monitor latency, resource utilization, and error metrics in real time. These performance metrics are periodically updated through the statistics monitoring loop 375, thus providing actionable feedback for dynamic system optimization. Performance data can be input to local server 305, where media encoding and/or optimization module can apply techniques to enhance bandwidth efficiency, reduce latency, and ensure high-quality playback.

A client originated event can be transmitted through client originated event interface 340, where commands such as touch gestures, clicks, or hardware input signals are captured. These inputs are processed in real time via interactive feedback loop 335 and integrated seamlessly into the content playback pipeline by process input module 385. This ensures that user actions, whether local or remotely relayed, trigger suitable responses on the displayed content.

The architecture can also include failover capabilities to ensure uninterrupted content delivery. Rendering failover content module 350 can activate preloaded failover assets in case of network failures or remote rendering interruptions, allowing playback continuity without visual or operational disruption.

Open WebSocket/TCP session module 355 can establish a secure and persistent communication channel between local server 305 and cloud servers (e.g., cloud-based management services 255, 260), facilitating real-time content updates and system commands. Open WebSocket/TCP session module 355 can remain open during active rendering tasks and can be terminated through close WebSocket/TCP session 395 when tasks are completed or connections are no longer needed.

Content rendering tasks can be executed locally by render media 360 module, which may process incoming video streams for playback. Content rendering operations can be complemented by decode picture module 365, which can decompress media streams and the decompressed media streams for display at virtual screen 300. In an example, for diagnostic purposes, the capture media module 370 can capture frames during playback and can input data into statistics module 325 for performance evaluation.

System cleanup and shutdown are executed systematically in the example of FIG. 3. In an example, stop remote content rendering module 390 halts remote rendering processes when updates are completed. Stop content loop module 399 can ensure that rendering loops executing at edge device client 277 are gracefully terminated. Finally, outdated content configurations are cleared from the system using remove content configuration module 405, freeing resources and preventing misconfigurations.

The operational workflow can begin with edge device local server 305 receiving push content configuration 345 commands from administrative servers, such as cloud-based management services 255, 260. These configurations can define rendering rules, media content, and failover parameters. Responsive to content configurations being applied, request content remote rendering module 315 retrieves required assets from remote/cloud servers. Received remotely rendered content 320 can then be processed locally via render media 360 of FIG. 3 delivered to display 110 of an edge device.

User interactions captured via client originated event interface 340 can be processed through the interactive feedback loop 335 and interpreted by process input module 385. Concurrently, statistics module 325 and statistics monitoring loop 375 can monitor playback performance and ensure real-time optimization via media encoding and/or optimization module 380.

In cases of failures or interruptions, the rendering failover content module 350 can seamlessly activate preloaded failover assets to maintain content availability. Communication channels established via open WebSocket/TCP module 355 can facilitate content and system updates, and when tasks conclude, stop remote content rendering module 390 and close WebSocket/TCP session 395 ensure graceful termination.

Finally, outdated or redundant configurations can be removed via the remove content configuration module 405, which may, in some examples, conclude the operational workflow and prepare the system for subsequent tasks.

FIG. 4 illustrates an example method for rendering high-resolution content to client displays with limited capabilities using server-based software. The method of in FIG. 4 outlines a scalable, secure, and highly adaptable streaming solution for delivering high-resolution content across multiple client displays equipped with SoC or external players. By integrating sandboxed browser environments, dynamic content preparation, adaptive delivery engines, and real-time synchronization modules, the system can ensure low-latency playback, seamless interaction, and efficient resource utilization. This method is particularly suited for retail signage networks, interactive kiosks, video wall systems, and large-scale digital display networks, where high-performance content delivery and administrative control are useful.

The method of FIG. 4 begins at block 400 with the stream player software (e.g., 190 of FIG. 1) executing on a centralized server environment. The method continues at block 402, which includes stream player 190 initializing and opening a plurality of browser or GUI application instances (220, 225, 230, 235, 240, 245), each operating as a sandboxed environment. These sandboxed windows are configured as isolated rendering instances, preventing cross-interference, overlap, misalignment, and ensuring secure content delivery.

The method of FIG. 4 continues at block 404 in which, responsive to initialization, window grab module 185 of FIG. 1 configures each application for optimal rendering resolution and content variation. Resolution adaptation module 435 (e.g., of FIG. 1) can dynamically adjust these settings to accommodate the capabilities of each client display.

The method of FIG. 4 continues at block 406, in which stream player 190 executes the real-time transmission of these sandboxed windows to displays 110, 120, and 130 and kiosks 150, 160, and 170, each of which may include a SoC. These displays are optimized to decode high-resolution content via a media decoder embedded or accessible to each of the edge devices/kiosks (e.g., 115, 125, 135, 155, 165, 175).

FIG. 5A shows a block diagram of an example multi-layer content delivery system that integrates cloud, edge, and client device layers to ingest, optimize, distribute, render, and monitor content seamlessly across diverse network conditions. The method of FIG. 5A can be implemented utilizing the system elements of FIGS. 1-3.

Block 502: Content Ingestion and Preparation at Cloud-based Management Services. The method of FIG. 5A begins at block 502, which includes receiving, preprocessing, and standardizing multimedia assets via cloud-based management services 255, 260, which ensures compatibility and readiness for distribution (block 522 of FIG. 5B). At block 502, content can undergo preprocessing (at block 524 of FIG. 5B) to standardize formats, apply encryption protocols, and ensure compatibility with edge devices/kiosks (e.g., 115, 125, 135, 155, 165, 175). Use of cloud-based management services ensures that all multimedia content remains up-to-date and ready for transmissions and to edge devices 115-135 and kiosks 155-175. Content can then be distributed (e.g., at block 526 of FIG. 5B) to browser or GUI application instances 220-245 via router 250. Statistics relevant to content delivery, such as frame drops, bit error rates, etc., can be monitored at, for example, block 528 of FIG. 5B.

Block 504: Aggregation and Optimization Utilizing External Player. The method of FIG. 5A continues at block 504, which includes aggregation, decoding, compressing, and optimizing of multimedia streams while dynamically managing network pathways for delivery to an edge device (115-135) and kiosks (155-175). Once content preparation is complete, the content can be transmitted to stream player 190, which provides a streaming and distribution resource that may operate as a processing and distribution hub (block 530 of FIG. 5C). Content such as multimedia streams are received by stream player 190 can be made available to the multi-input module 195, which aggregates audio, video, and metadata from cloud sources, live feeds, and other devices (at block 532 of FIG. 5C). Streams can be processed by stream player 190, where decoding, compression, and content optimization occur (at block 534 of FIG. 5C). Window grab module 185 can then capture (at block 536 of FIG. 5C) specific content of windows, arrange content from the content windows within the browser or GUI application instances (220-245) in a defined layout, and prepares windows for rendering on edge devices. The optimized streams are routed to the multi-input/multi-output module 195, where content is divided, packaged, and prepared for transmission to edge and client devices (at block 538 of FIG. 5C).

Block 506: Localized Processing and Failover Management at Edge Devices. The method continues at block 506 which includes localized caching, failover activation, and real-time user interaction processing at the edge devices (115-135) and kiosks (155-175). The optimized content streams are transmitted (block 540 of FIG. 5D) to the edge devices (115-135) and kiosk (155-175), where localized processing and failover management occur. Localized processing and failover management at an edge device receives and caches (block 542 of FIG. 5D) incoming streams, thus ensuring that the incoming streams are readily available for rendering. In the event of a network failure or connectivity disruption, a failover content module function executing at stream player 190 activates (block 544 of FIG. 5D) preloaded multimedia assets from local storage, thus ensuring uninterrupted playback.

Simultaneously, at block 506, a stream player (190) can execute a device interaction loop function to capture (block 546 of FIG. 5D) real-time user interactions, including touch gestures, button presses, or navigation inputs, and processes such interactions locally to minimize latency. Performance metrics, such as device resource utilization, decoding latency, and error rates, are periodically or intermittently monitored (block 548 of FIG. 5D) by a client device performance monitor (191 of FIG. 1) and transmitted to the stream player. In an example, each of edge devices 115-135 and kiosks 155-175 can continue rendering content independently, even under adverse network conditions.

Block 508: Rendering and User Interaction at an Edge Device. The method continues at block 508, which includes dynamic adjustment of resolution, decoding of content, and capturing of user interactions for client device playback. Content is delivered to client devices, where the content can be rendered (block 550 of FIG. 5E) on an individual edge device. Resolution adaptation (block 552 of FIG. 5E) may be executed at stream player 190 to dynamically adjust resolution, bitrate, and compression settings based on the network bandwidth, device capabilities, and current system health metrics.

In an example, content streams can be decoded by (block 554 of FIG. 5E), for example, by an SoC Media Decoder within each of the edge devices (115-135) and kiosk (155-175), ensuring optimal playback performance with minimal resource overhead. The decoded content is displayed on the client device with accurate frame alignment and synchronization. The edge devices (115-135) and kiosks (155-175) can capture (block 556 of FIG. 5E) user inputs, gestures, and control commands, relaying the user inputs to stream player (190) for immediate processing. Real-time metrics related to frame rate drops, network latency, and hardware utilization can be monitored (block 558 of FIG. 5E) by client device performance monitor 191, which operates within stream player 190. In an example, based on monitoring at block 558 of FIG. 5E, a frame rate can be adjusted to accommodate a decrease in available bandwidth, so as to adapt to a changing channel condition (block 560 of FIG. 5E).

Block 510: Real-Time Interaction Loops. The method continues at block 510, which includes synchronized rendering, interaction, and feedback loops across cloud, edge, and client devices. The system ensures (block 562 of FIG. 5F) both user-initiated and server-initiated interaction models, enabling bi-directional communication and adaptive optimization across all portions of, for example, the system of FIG. 1.

Block 510 can include operations which include three distinct real-time loops:

Rendering Loop: Ensures continuous and synchronized content rendering across cloud, edge, and client layers. Processed data (block 564 of FIG. 5F) flows from cloud-based management services to edge devices in near real-time, maintaining frame-accurate playback.

Interaction Loop: Captures user interactions at the client device layer and processes the user interactions locally at the edge layer before relaying (block 556 of FIG. 5F) user interactions to the streaming and cloud layers. This loop ensures immediate responsiveness to user inputs.

Feedback Loop: Real-time performance metrics, including latency, buffer status, and error rates, are collected (block 568 of FIG. 5F) at all layers of the system of FIG. 1 transmitted to cloud-based management services. The cloud-based management services the performance metrics and dynamically adjusts compression levels, bitrate allocation, and rendering configurations.

At block 510, a statistics collection module, which operates via client device performance monitor 191, can intermittently or periodically monitor frame rates, compression efficiency, error occurrences, and latency metrics, feeding performance data to cloud-based management services (e.g., 255, 260) dynamic optimization. In an example, at block 510, based on user interaction with the client device, the stream generation module and network optimization module dynamically adapt the buffer size to rapidly decrease latency to a minimum (zero or negligible latency) and improves user experience and responsiveness. Accordingly, based on user interactions with an edge device, a decrease in buffer size can result in immediate feedback to the user input. At block 510, based on an absence of user interaction with the client device, the buffer size can be increased. In an example, this increase may enable the stream player to use computational resources effectively to generate a stream with a higher framerate, thus delivering content at an increased resolution.

In another example, block 506 of FIG. 5F may include adaptive adjustment of a playback buffer based on real-time user interaction behavior. For example, based on a user interaction event (such as a click, gesture, or keystroke) is detected within the last two seconds, a buffer size may be reduced to a single frame to minimize latency. Conversely, based on no interaction being detected for more than ten seconds, the buffer size may be expanded to ten frames to prioritize stream stability and visual quality. This behavior may be governed by a time-windowed activity monitor and implemented using exponential smoothing to prevent abrupt shifts in buffer size.

The rendering, feedback, and interaction loops can operate concurrently, ensuring smooth communication and coordination across all layers while dynamically addressing performance bottlenecks.

In addition to user-initiated interactions, the system of FIG. 1 supports server-initiated interaction loops originating from a virtualized interface or server-side application logic. These interactions—such as automated print commands, UI updates, or data queries—are generated at the server or virtual screen layer and transmitted downstream to the edge device for execution.

The edge layer receives and interprets these server-originated commands and may act on such commands locally (e.g., triggering a receipt printer or displaying updated content). These server-initiated interactions can operate in parallel with the user-initiated interaction and feedback loops, ensuring seamless responsiveness and real-world integration of virtualized applications.

Performance metrics related to execution fidelity, hardware control latency, and command acknowledgement are collected and reported back to the cloud-based management services for ongoing adaptive optimization. This loop enables applications running in the cloud or virtual interface layer to initiate and complete device-level actions without requiring direct user input at an edge device.

Block 512: Virtual Screen Mapping and Alignment. Block 512 can execute within stream player 190 to map multimedia streams (block 570 of FIG. 5G) to client displays with precise orientation, alignment, and optimized resolution. During content delivery, block 512 can include a virtual screen mapping process that maps multimedia streams from a virtual rendering server to client displays. This mapping ensures (block 572 of FIG. 5G) that content is rendered in the correct orientation, alignment, and window size on each client device. In an example, block 512 can include retrieving a logical layout of browser windows or multimedia display layers and mapping the layers onto the dimensions of a display of edge devices/kiosks (e.g., 115, 125, 135, 155, 165, 175). Block 512 can further include coordinate normalization and resolution scaling so that content can be resized proportionally to maintain an aspect ratio. This can include letterboxing or pillar boxing where needed. Alignment may be performed using a transformation matrix, such as a 2D affine transform, to ensure the mapped content occupies the intended screen area. These combined operations ensure accurate spatial alignment and sizing across virtual and physical display layers.

The window grab module 185 and a resolution adaptation function operates within client device performance monitor 191, collaborating (block 574 of FIG. 5G) to ensure accurate window alignment and optimized display resolution, preventing visual artifacts or misalignment across devices.

Block 514: Adaptive Resolution Adjustment. Block 514 can execute within stream player 190 to adjust resolution, frame rate, and compression based on real-time network and device performance conditions. The method further enhances efficiency through adaptive resolution adjustment. The resolution adaptation function, operating within client device performance monitor 191 analyzes (block 576 of FIG. H) real-time network conditions, available bandwidth, and device resource capabilities to dynamically adjust resolution (block 578 of FIG. H), frame rate, and compression levels. Block 514 can include the use of an adaptive resolution controller to monitor client-side bandwidth and latency in real time. Based on latency exceeding 300 milliseconds, for example, or based on available bandwidth falling below 3 Mbps, the resolution may be reduced to a lower preset (e.g., 720p). Based on latency dropping below 150 ms and bandwidth exceeding 10 Mbps for a sustained interval (e.g., 10 seconds), the resolution may be increased to 1080p. These rules may be enforced using a finite-state logic model with hysteresis to prevent frequent toggling between states. Adjustments may be issued at fixed intervals, such as every 5 seconds, to balance responsiveness and stability.

During network congestion, lower-resolution streams may be prioritized (block 580 of FIG. H) to maintain playback continuity, while high-bandwidth scenarios allow higher-resolution content to be delivered seamlessly.

Block 516: Failover Activation. Block 516 includes activating preloaded backup content from local storage during network disruptions to ensure uninterrupted playback. In scenarios where network connectivity is interrupted or latency thresholds are exceeded, a failover content module, operating within stream player 190 can activate (block 582 of FIG. 5I) preloaded backup content stored locally on the edge device servers. This module operates independently from the upstream servers, allowing devices to continue playback (block 584 of FIG. 5I) uninterrupted until connectivity is restored (block 586 of FIG. 5I). In an example, block 516 can include detection of failover conditions using a network health monitor. For example, a failover may be triggered based on three consecutive heartbeat messages are not received, or based on round-trip latency exceeding 800 milliseconds for more than 10 continuous seconds. Upon triggering, block 516 may include loading pre-cached content stored locally in a standardized format such as H.264, a cached website or recorded loop of the previously played content. The local player may resume playback from this source without needing external network input. When latency drops below a recovery threshold (e.g., 300 ms), playback may automatically resume from the primary content stream.

Block 518: Performance Monitoring and System Optimization. Block 518 includes collecting (block 588 of FIG. 5J) and analyzing performance metrics to apply real-time optimizations across the streaming system. Throughout the method, real-time performance data is collected by statistics collection loop 290 of FIG. 2 (block 590 of FIG. 5J), which operates within stream player 190. This data is analyzed at the cloud layer, where system-wide optimizations are applied dynamically (block 592 of FIG. 5J). Block 518 can include continuous collection of real-time performance data from the client playback environment (e.g., at edge devices/kiosks 115, 125, 135, 155, 165, 175), which can include decoding latency, buffer fill percentage, and frame drop rate. Block 518 can include analyzing performance metrics to identify degraded conditions. Based on performance dropping below a threshold (e.g., a frame drop rate exceeding 5%), block 592 may include applying dynamic stream-level optimizations such as reducing the bitrate, lowering resolution, or modifying frame pacing in real time. These changes may be effected via local stream control APIs without requiring server intervention.

Adjustments include compression ratios, bitrate allocations, traffic rerouting, and content priority handling, ensuring optimal performance under varying conditions.

Block 520: Iterative Feedback and Optimization. At block 520 performance data can be utilized iterative system improvements and dynamic reconfiguration for future streaming cycles. Block 520 includes an iterative feedback loop where collected performance metrics, user interaction data, and content status reports are fed back (block 594 of FIG. 5K) one or more of cloud-based management services 255, 260. Services 255, 260 can operate to analyze such feedback (block 596 of FIG. 5K), apply optimizations, and update configurations (block 598 of FIG. 5K) for subsequent streaming cycles. Block 520 can include collecting performance telemetry and interaction reports from edge and client devices in a structured format such as JSON. At block 596, for example, this data may be analyzed using a weighted scoring function in which each metric (e.g., latency, frame drops, interaction rate) contributes to a composite health score. For example, latency may be weighted at 0.5, drop rate at 0.3, and interaction rate at 0.2. Based on an aggregate score falling below a specified threshold (e.g., 70 out of 100), block 598 may include generating an updated configuration profile-such as bitrate caps or codec adjustments-which is then transmitted to the devices to govern subsequent playback sessions.

Alternatively or in addition, an administrator, such as an administrator interfacing to router 250 via cloud-based management services 255, 260, can provide new content for display via one or more of edge devices 115-135 and kiosks 155-175. In an example, such new content can include a new menu item for use in a kiosk-based fast food ordering system utilizing one or more of kiosks 150-170. In another example, such new content can include a new price list and/or product offerings to be displayed via one or more of displays 110-130.

FIG. 5K is a block diagram illustrating an example iterative feedback and optimization process, including feed 594, analyze 596, and update configurations 598.

FIG. 6 shows a block diagram of an example method for remote rendering. The method of FIG. 6 begins at block 600, which includes cloud-based management services 255, 260 assigns new or updated content to one or more of edge devices 115-135 and kiosks 155-175. In an example, such new content pushed from services 255, 260 may represent failover content. In one example, certain visual features may be lacking in failover content, such as static pictures rather than video content. In an example, by displaying failover content, at least certain aspects of new content can be pushed, such as at block 610, to at an edge device even without high-quality feature-rich rendering as provided by stream player 190.

At block 620, one or more of edge devices 115-135 and kiosks 155-175 can request content, such as new pushed content, to be rendered via a local server, which may be represented by stream player 190. In an example, an edge device can transmit configuration information, such as video image resolution (e.g., 720P, 1080P, 4K, 8K, 16K, etc.) to a local server (e.g., stream player 190). Via such requests, a stream player can enrich content such as by suitably positioning text and video within the confines of the display of each of the edge devices.

At block 630, a local server, which may include stream player 190 rendering content that is suitable for each of edge devices 115-135 and kiosks 155-175. Thus, for example, certain content encoded in 4K may be down-sampled so as to be suitably displayed via an edge device having a resolution of 720P. In another example, certain content encoded in 1080P may be up-sampled so as to be suitably displayed via an edge device having a resolution of 4K.

It is noted that block 630 represents a process in which content is transmitted from a local server (e.g., local server 275) at a frame rate of one frame per second, 10 frames per second, 32 frames per second, or at any other suitable frame update rate. Accordingly, video displayed via edge devices 115-135 and kiosks 155-175 can be rendered so as to appear smooth and pleasing to a viewer of a display of an edge device.

In an example, a local server (e.g., stream player 190) can include a virtual screen, in which content is rendered on a frame-by-frame basis prior to transmission for display at an edge device. In one example, such virtual rendering, in which video is not displayed via an edge device, can allow a local server to adjust video to be displayed, perform image filtering, or other manipulations of displayed text, still pictures, or content prior to rendering of the content via an edge device.

The method can continue at block 640, wherein one or more of edge devices 115-135 and kiosks 155-175 compiles and/or transmits rendering statistics. For example, an edge device may measure latency in frames transmitted from, for example, stream player 190. In another example, an edge device may measure a number of lost frames per unit time. In another example, an edge device may measure picture resolutions, or any other statistical measurement related to the content displayed via a display of an edge device.

The method can continue at block 650, wherein an edge device can receive interactions from a user, such as a human, who may select a menu item at, for example, a fast-food kiosk ordering environment. Other possible user inputs can include button bushes, movement of a keyboard mouse, selection of an item via a touchscreen, detection of a gesture expressing a user intent, or any other signal initiated by a user. In an example, block 650 may be performed repeatedly as a user selects more than one menu item in a fast-food kiosk environment or provides another input so that user inputs can be collected at a local server, such as stream player 190.

The method can continue at block 655. This block represents reception of device-originated interactions that are not necessarily user-initiated. These interactions may be generated by application logic running in a virtual screen or cloud-based system and transmitted to the edge device. Examples include print commands, sensor-triggered actions, or UI updates initiated from the server. These interactions are received by the edge device and processed locally, often involving peripheral hardware or service-level logic at the edge layer.

The method can continue at block 660, wherein displayed content is directed to be removed and replaced with new content at an edge device. In an example, a user interacting with a display at a retail cosmetics establishment may select a certain product (e.g., a blush). Responsive to selection of such product, new content, such as available types of blush (e.g., rose colored blush, peach colored blush, rouge colored blush, etc.). In an example, an administrator may transmit direction to remove certain content at block 660 based on a user selection.

The method can continue at block 670, which can include removal of content at an edge device. In an example, removed content can be replaced by new content such as content directed to be removed and replaced by an administrator, such as described in reference to block 660.

In an example, a system for delivering content to client displays includes a cloud server for managing assets and providing real-time performance feedback; one or more edge servers, each equipped with a failover content module for locally caching multimedia streams and activating preloaded content in the event of network failures; a streaming server responsible for content distribution and real-time adjustment of parameters based on performance feedback; and a plurality of client devices, each with a virtual screen and a local rendering module, receiving and displaying content.

In an example, a content delivery system can include at least one cloud server for managing assets and providing real-time performance feedback; at least one edge server edge servers, each equipped with a failover content module for locally caching multimedia streams and activating preloaded content in the event of network failures; and a plurality of client devices, each communicatively coupled to an edge server and configured to display received content, each client device comprising a display unit and a user interface module. In an example, the system may further include a central management system for dynamically adjusting system parameters (resolution, frame rate, compression) based on real-time performance metrics and user interaction data.

In an example, an edge device for content delivery includes: a processor; memory for storing pre-loaded content and receiving streamed content; a display unit; a network interface; a local rendering module integrated with the processor and configured to decode and render content from memory or a network stream; a failover module integrated with the processor and configured to seamlessly switch to pre-loaded content in response to network interruptions or exceeding a pre-defined latency threshold; and a user interface module for receiving and processing user input signals. In an example, the edge device the processor is a System-on-a-Chip (SoC) integrating a central processing unit (CPU), a graphics processing unit (GPU), memory, and input/output (I/O) controllers onto a single semiconductor die.

In an example, a content server for a multi-tiered content delivery system includes a processor; memory for storing multimedia assets and real-time performance data; a network interface for communicating with edge devices and cloud services; a streaming module configured to aggregate, encode, compress, and distribute multimedia streams to edge devices; a real-time performance monitoring module to collect and analyze performance metrics from edge devices and cloud services; and a content management module to dynamically adjust streaming parameters (e.g., resolution, bitrate, compression) based on the performance metrics collected.

The disclosed methods and systems can enable a more secure system at least in part because the "server browser" or GUI application is always up to date with all security patches, thus minimizing security vulnerabilities. By way of example, the edge device client can have old versions of the operating system (OS), browser, and other components that can have vulnerabilities. In an example, the edge device may be a "light client" and the risk of the client having security vulnerabilities is reduced. In this example and by way of example, the edge device may perform the video stream from server to client that is secured (e.g., encrypted) by standard and safe algorithms and interactions plus statistics that are only forwarded from client to the server. Thus, the server can accommodate and enable the security of the interactions (with patched OS and apps).

In an example, the transport encryption can be done using standard transport layer security (TLS) over a transmission control protocol (TCP) connection.

The remote rendering server can be maintained and patched with security patches with no or minimal limitations. In an example, a remote rendering server can utilize an operating system such as Linux® (e.g., RedHat®, Ubuntu®), Windows®, or MacOS® that can be upgraded/updated with the required security patches (in addition with newly developed feature sets). In some instances, an ability to upgrade an operating system at a remote rendering server removes a need to provide updates to operating systems at edge devices (e.g., 115, 125, 135, etc.), which may be updated for a limited period of time (e.g., 2 years, 3 years, 5 years, 7 years, etc.).

In an example, a system for delivering content to client displays includes a cloud server for managing assets and providing real-time performance feedback; one or more edge servers, each equipped with a failover content module for locally caching multimedia streams and activating preloaded content in the event of network failures; a streaming server responsible for content distribution and real-time adjustment of parameters based on performance feedback; and a plurality of client devices, each with a virtual screen and a local rendering module, receiving and displaying content. In an example, the system may further include a central management system for dynamically adjusting system parameters (resolution, frame rate, compression) based on real-time performance metrics and user interaction data.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once the general-purpose computer is programmed to perform particular functions, such as pursuant to program software instructions.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including computer operating systems, such as Windows®, iOS®, Linux, a mobile operating system, such as iOS®, Android®, Windows Mobile®, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, an Internet service provider, a social network platform, just to provide a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

What is claimed is:

1. A computer-implemented method for displaying rendered content, comprising:

receiving multimedia assets, including any one or more of video, audio, and interactive data, into a cloud server, wherein the cloud server preprocesses the assets by standardizing formats, applying encryption protocols, and providing compatibility with the cloud server;

transmitting the preprocessed multimedia assets to a streaming and distribution layer, wherein a multi-input (MI) module aggregates multimedia streams, and a stream player decodes, compresses, and optimizes the multimedia streams to form optimized content;

transmitting optimized content to an edge device server, wherein the edge device server caches optimized content locally, and a failover content module activates preloaded multimedia assets from local storage in response to network disruptions;

rendering content on a client device via a stream player software, wherein a resolution adaptation module dynamically adjusts resolution and compression based on device and network conditions, and a content interaction interface captures user interactions;

establishing synchronized rendering loop, interaction loop, and feedback loop between the cloud server, the edge device server, and the client device;

mapping, via a virtual screen to align multimedia streams on the client device;

dynamically analyzing real-time network conditions and device capabilities via the resolution adaptation module to adjust resolution, frame rate, and compression parameters;

dynamically adjusting a size of a buffer during user interactions with the client device via the resolution adaptation module and stream generation module; and using the failover content module to activate preloaded multimedia assets from edge device storage when network connectivity is disrupted or latency thresholds are exceeded.

2. The method of claim 1, further comprising:

collecting performance metrics, analyze data, and apply optimizations across, streaming, edge, and the client device; and conveying performance metrics and usage data back to the cloud server, analyzing feedback from the feedback loop, and dynamically updating system configurations.

3. The method of claim 1, wherein the multi-input (MI) module aggregates data streams from live feeds, cloud sources, and metadata sources.

4. The method of claim 1, wherein the failover content module is triggered in response to detecting network disruptions beyond predefined latency threshold.

5. The method of claim 1, wherein the resolution adaptation module dynamically adjusts resolution settings based on real-time bandwidth availability and hardware performance metrics of the client device.

6. The method of claim 1, wherein performance monitoring includes tracking latency, compression efficiency, error rates, and resource utilization metrics.

7. The method of claim 1, wherein the feedback loop transmits real-time performance metrics from the client device to the cloud server for iterative optimization.

8. The method of claim 7, wherein the iterative optimization includes dynamically reconfiguring compression levels, bitrate allocation, and content priority based on collected performance data.

9. The method of claim 1, wherein virtual screen mapping ensures accurate window alignment across at least one additional client device that is heterogeneous to the client device with varying display resolutions and aspect ratios.

10. The method of claim 1, wherein the streaming and distribution layer dynamically reroutes network traffic to reduce latency and congestion during content delivery.

11. The method of claim 1, wherein the dynamically adjusting of the buffer size includes reducing the buffer size based on the user interactions with the client device.

12. The method of claim 1, wherein dynamically adjusting the buffer size includes increasing the buffer size based on an absence of the user interactions with the client device.

13. A computer-implemented method for delivering content across a multi-layer network system, comprising:

receiving multimedia assets for storage into a cloud-based repository;

preprocessing and optimizing the assets within the cloud-based repository, dynamically adjusting parameters based on real-time performance metrics collected via a statistics collection module;

distributing the optimized assets to edge devices via a streaming layer;

caching multimedia streams locally on edge devices, and activating pre-loaded failover content from local storage via a failover content module in response to network disruptions or latency thresholds exceeding a predetermined value;

rendering content on client displays using a virtual screen or frame buffer;

capturing and processing user interactions from a plurality of client devices via a device interaction loop, relaying these interactions to the cloud-based repository for real-time responses;

dynamically adjusting resolution, bitrate, and compression settings based on network conditions, device capabilities, and real-time performance metrics obtained from one of the plurality of client devices; and implementing iterative feedback loops across cloud, edge, and client layers for continuous monitoring, optimization, and dynamic reconfiguration of streaming workflows.

14. The method of claim 13, wherein the virtual screen dynamically modifies media rendering.

15. The method of claim 13, wherein the statistics collection module includes periodic performance analysis and provides insights into iterative optimization of streaming parameters.

16. A system for delivering content to client displays, comprising:

a cloud server configured to ingest, preprocess, and optimize multimedia assets;

a streaming server communicatively coupled to the cloud server and configured to aggregate, decode, compress, and distribute multimedia streams;

an edge server communicatively coupled to the streaming server and configured to perform localized processing, caching, and failover management; and a plurality of client displays, each equipped with a system-on-a-chip (SoC) player and communicatively coupled to the edge server, each client display configured to render content received from the edge server.

17. The system of claim 16, wherein the streaming server includes:

a multi-input (MI) module to aggregate multimedia streams from multiple sources;

a stream player to decode, compress, and optimize multimedia streams;

a multi-output (MgO) module to distribute optimized streams to the edge server; and a window grabbing module to arrange content windows.

18. The system of claim 17, wherein the edge server includes:

a localized processing module to execute caching and real-time user interaction;

a stream generation and resolution adaptation module to dynamically adjust buffer size for zero latency during user interaction and increased latency while user is non-interacting for best visual performance;

a failover management module to activate preloaded content in case of network disruptions;

a router to manage network pathways and optimize traffic; and a feedback loop to transmit performance metrics back to the cloud server.

19. The system of claim 18, wherein each client display comprises:

a SoC player;

a virtual screen to display content;

a local rendering module to decode and render content; and a user interaction module to capture and process user interactions.

20. The system of claim 19, further comprising: a central management system configured to monitor performance, dynamically adjust system parameters, and implement iterative feedback loops to optimize streaming workflows.

* * * * *